US012789448B2

(12) United States Patent
Natarajan et al.

(10) Patent No.: US 12,789,448 B2
(45) Date of Patent: Nov. 10, 2026

(54) BINDERS COMPRISING A MONOMER AND AN INITIATOR FOR USE IN ADDITIVE MANUFACTURING

(71) Applicant: General Electric Company, Schenectady, NY (US)

(72) Inventors: Arunkumar Natarajan, Mason, OH (US); Kwok Pong Chan, Niskayuna, NY (US); Vadim Bromberg, Niskayuna, NY (US); Joshua Tyler Mook, Cincinnati, OH (US); William C. Alberts, Saratoga Springs, NY (US)

(73) Assignee: General Electric Company, Evendale, OH (US)

( * ) Notice: Subject to any disclaimer, the term of this patent is extended or adjusted under 35 U.S.C. 154(b) by 240 days.

(21) Appl. No.: 17/889,764

(22) Filed: Aug. 17, 2022

(65) Prior Publication Data

US 2023/0082562 A1 Mar. 16, 2023

Related U.S. Application Data

(60) Provisional application No. 63/237,577, filed on Aug. 27, 2021.

(51) Int. Cl.

| | |
|---|---|
| ***B29C 64/165*** | (2017.01) |
| ***B33Y 10/00*** | (2015.01) |
| ***B33Y 70/00*** | (2020.01) |
| ***C08F 16/32*** | (2006.01) |
| ***C08F 126/10*** | (2006.01) |
| ***C08F 216/12*** | (2006.01) |
| ***C08F 222/10*** | (2006.01) |

(52) U.S. Cl.

CPC ............ *B29C 64/165* (2017.08); *B33Y 10/00* (2014.12); *B33Y 70/00* (2014.12); *C08F 16/32* (2013.01); *C08F 126/10* (2013.01); *C08F 216/125* (2013.01); *C08F 222/102* (2020.02)

(58) Field of Classification Search

CPC .. C08F 222/10; C08F 222/102; C08F 220/12; C08F 220/18; C08F 4/04; C07C 407/00; C07C 409/00

See application file for complete search history.

(56) References Cited

U.S. PATENT DOCUMENTS

| | | | | |
|---|---|---|---|---|
| 4,138,255 | A * | 2/1979 | Crivello | G03F 7/029 522/170 |
| 4,374,751 | A * | 2/1983 | Dudgeon | C08G 59/68 522/170 |
| 4,543,373 | A | 9/1985 | Krawiec et al. | |
| 5,640,667 | A | 6/1997 | Freitag et al. | |
| 6,375,874 | B1 | 4/2002 | Russell et al. | |
| 6,508,980 | B1 | 1/2003 | Sachs et al. | |
| 6,773,474 | B2 * | 8/2004 | Koehnle | C08F 290/061 51/293 |
| 7,120,512 | B2 | 10/2006 | Kramer et al. | |
| 7,220,380 | B2 | 5/2007 | Farr et al. | |
| 7,329,379 | B2 | 2/2008 | Boyd et al. | |
| 7,365,129 | B2 | 4/2008 | Kramer et al. | |
| 7,381,360 | B2 | 6/2008 | Oriakhi et al. | |
| 7,431,879 | B2 | 10/2008 | Kasai et al. | |
| 7,550,518 | B2 | 6/2009 | Bredt et al. | |
| 7,569,273 | B2 | 8/2009 | Bredt et al. | |
| 7,700,020 | B2 | 4/2010 | Nielsen et al. | |
| 7,744,205 | B2 | 6/2010 | Sarkisian et al. | |
| 7,829,000 | B2 | 11/2010 | Farr et al. | |
| 7,880,341 | B2 | 2/2011 | Shin | |
| 8,362,148 | B2 | 1/2013 | Messe et al. | |
| 8,475,946 | B1 | 7/2013 | Dion et al. | |
| 8,845,953 | B1 | 9/2014 | Balistreri et al. | |
| 9,216,547 | B2 | 12/2015 | Elsey | |
| 9,643,360 | B2 | 5/2017 | Kashani-Shirazi | |
| 9,770,867 | B2 | 9/2017 | Mgele et al. | |
| 9,790,381 | B2 | 10/2017 | Arita et al. | |
| 9,790,388 | B2 | 10/2017 | Wang et al. | |
| 9,796,862 | B2 | 10/2017 | Morita et al. | |
| 9,873,228 | B2 | 1/2018 | Suzuki et al. | |
| 9,908,819 | B1 | 3/2018 | Kollenberg | |
| 10,189,204 | B2 | 1/2019 | Fulop et al. | |

(Continued)

FOREIGN PATENT DOCUMENTS

| | | | |
|---|---|---|---|
| CN | 110126266 A | | 8/2019 |
| CN | 110776855 B | * | 1/2021 |

(Continued)

OTHER PUBLICATIONS

Machine translation of CN-110776855-B (2021, 10 pages).*
Machine translation of JP 6310180 (2018, 23 pages).*
Xin (NIR-sensitized cationic frontal polymerization of vinyl ether and epoxy monomers. Process in Organic Coatings, 153, 2021, 106149, 8 pages).*
Sundell (Thermally Induced Cationic Polymerization of Divinyl Ethers Using Iodonium and Sulfonium Salts. Journal of Polymer Science Part A: Polymer Chemistry, 1991, 29, pp. 1535-1543).*
King (K-Pure CXC-1612, King Industries, 2025, 2 pages).*
Crivello (Photoinitiated Cationic Polymerization by Dialkyl-4-hydroxyphenylsulfonium Salts, Journal of Polymer Science: Polymer Chemistry Edition, 1980, 18, pp. 1021-1034).*

(Continued)

*Primary Examiner* — Brieann R Johnston
(74) *Attorney, Agent, or Firm* — Dinsmore & Shohl LLP

(57) ABSTRACT

A binder comprises a monomer and an initiator. The monomer comprises at least one of a difunctional monomer and a monofunctional monomer. A method of manufacturing a part includes depositing a layer of particulate material on a working surface; selectively applying a binder in at least one of an edge of the layer of particulate material and an infill pattern representative of a stress of the object; repeating the steps of depositing and selectively applying to form a plurality of layers of particulate material with the applied binder; and exposing the plurality of layers of particulate material with the applied binder to an excitation source to decompose the initiator and initiate polymerization of the monomer to thereby form the green body part.

13 Claims, 3 Drawing Sheets

(56) References Cited

U.S. PATENT DOCUMENTS

| | | | |
|---|---|---|---|
| 10,232,437 | B1 | 3/2019 | Yavari et al. |
| 10,272,592 | B2 | 4/2019 | Demuth et al. |
| 10,343,301 | B2 | 7/2019 | Gnther et al. |
| 10,392,521 | B2 | 8/2019 | Ng et al. |
| 10,449,692 | B2 | 10/2019 | Balistreri et al. |
| 2001/0001640 | A1 | 5/2001 | Miller et al. |
| 2006/0267252 | A1 | 11/2006 | Steinmann et al. |
| 2015/0344682 | A1 | 12/2015 | Ganapathiappan et al. |
| 2016/0236412 | A1 | 8/2016 | Kusahara et al. |
| 2016/0257070 | A1 | 9/2016 | Boydston et al. |
| 2016/0257843 | A1 | 9/2016 | Boydston et al. |
| 2017/0226360 | A1 | 8/2017 | Chen et al. |
| 2017/0297100 | A1 | 10/2017 | Gibson et al. |
| 2017/0297106 | A1 | 10/2017 | Myerberg et al. |
| 2018/0009157 | A1 | 1/2018 | Gutierrez et al. |
| 2018/0236543 | A1 | 8/2018 | Hart et al. |
| 2018/0236544 | A1 | 8/2018 | Benn et al. |
| 2018/0236545 | A1 | 8/2018 | Trump et al. |
| 2018/0237648 | A1 | 8/2018 | Barbati et al. |
| 2018/0248191 | A1 | 8/2018 | Liu et al. |
| 2018/0311728 | A1 | 11/2018 | Kottilingam et al. |
| 2019/0010091 | A1 | 1/2019 | Nordahl |
| 2019/0039121 | A1 | 2/2019 | Bodinger et al. |
| 2019/0054527 | A1 | 2/2019 | Natarajan et al. |
| 2019/0127517 | A1 | 5/2019 | Vidavsky et al. |
| 2019/0134895 | A1 | 5/2019 | Abbott, Jr. et al. |
| 2019/0168297 | A1 | 6/2019 | Xiao |
| 2019/0248932 | A1 | 8/2019 | Korshikov et al. |
| 2019/0315981 | A1 * | 10/2019 | Nishiura ................ B33Y 10/00 |
| 2019/0337053 | A1 | 11/2019 | Moosberg et al. |
| 2021/0371619 | A1 | 12/2021 | Natarajan et al. |

FOREIGN PATENT DOCUMENTS

| | | | | | |
|---|---|---|---|---|---|
| EP | 0043395 | A1 | | 1/1982 | |
| EP | 0354376 | A1 | | 2/1990 | |
| JP | 2005171299 | A | | 6/2005 | |
| JP | 6310180 | B2 | * | 4/2018 | ................ C08J 5/04 |
| WO | WO-8001723 | A1 | * | 8/1980 | ............ C08G 85/00 |
| WO | 2002078907 | A2 | | 10/2002 | |
| WO | 2017146711 | A1 | | 8/2017 | |
| WO | 2018015553 | A1 | | 1/2018 | |
| WO | 2018020331 | A1 | | 2/2018 | |
| WO | WO-2019106031 | A1 | * | 6/2019 | ............ C08G 59/38 |
| WO | 2019147265 | A1 | | 8/2019 | |
| WO | 2019157074 | A2 | | 8/2019 | |
| WO | 2019213596 | A1 | | 11/2019 | |
| WO | 2019213602 | | | 11/2019 | |
| WO | 2019221999 | A1 | | 11/2019 | |
| WO | 2020099241 | A1 | | 5/2020 | |

OTHER PUBLICATIONS

Lee, et al., "A Study on Reduction of Processing Time and Improvement of Strength by using Photopolymer Resin in the 3DP Process, Key Engineering Materials", Dec. 1, 2006, ISSN: 1662-9795, vols. 326-328, pp. 151-154 doi:10.4028/www.scientific.net/KEM.326-328.151 © 2006 Trans Tech Publications, Switzerland.

Murakami, et al., (2006) "Positive direct-mask stereolithography with multiple-layer exposure: layered fabrication with stair step reduction", Virtual and Physical Prototyping, 1:2, 73-81, DOI: 10.1080/17452750600649492.

Frykholm, et al., "Solid State Sintered 3-D Printing Component by Using Inkjet (Binder) Method", Jan. 14, 2016, 6 pages, Tokyo 107-0052 Japan.

Grant, et al., "Mitigating Distortion During Sintering of Binder Jet Printed Ceramics", Solid Freeform Fabrication 2018: Proceedings of the 29th Annual International Solid Freeform Fabrication Symposium—An Additive Manufacturing Conference, 8 pages.

LV, et al., "Binder jetting of ceramics: Powders, binders, printing parameters, equipment, and post-treatment", Ceramics International, Apr. 6, 2019, 17 pages.

Kruft, Jr., Jonathan G., Thesis entitled "Pressureless Sintering of Powder Processed Graded Metal-Ceramic Composites Using a Nanoparticle Sintering Aid and Bulk Molding Technology", Master of Science, 2007, 138 pages.

Extended European Search Report for Application No. 22187171.8 dated Jan. 20, 2023 (7 pages).

* cited by examiner

BINDERS COMPRISING A MONOMER AND AN INITIATOR FOR USE IN ADDITIVE MANUFACTURING

CROSS-REFERENCE TO RELATED APPLICATIONS

The present specification claims the benefit of U.S. Provisional Application Ser. No. 63/237,577 filed Aug. 27, 2021 and entitled "Binders Comprising a Monomer and an Initiator For Use In Additive Manufacturing," the entirety of which is incorporated by reference herein.

FIELD

The present specification relates to additive manufacturing. More specifically, the present specification is directed to binders for use in additive manufacturing.

TECHNICAL BACKGROUND

Additive manufacturing, also known as three-dimensional (3D) printing, is a process in which material is built up layer-by-layer to form an object. Binder jetting is an additive manufacturing technique based on the use of a binder to join particles of a powder to form a 3D object. In particular, the binder is jetted onto successive layers of the powder in a build volume, where layers of the powder and the binder adhere to one another to form a 3D object. For many manufacturers, a high throughput is desired to maximize efficiency. However, binder solutions previously available for binder jet 3D printing include a relatively high amount of solvent, which leads to increased curing times and, thereby, slower printing speeds and decreased throughput.

In some applications, the as-printed part is suitable for end-use without further processing or manipulation. In other applications, subsequent processing, such as removal of the binder and sintering of the powder, may be needed to transform the printed three-dimensional part into a finished part. Accordingly, it is desirable for the printed part to have a suitable green strength for handling (e.g., transferring, inspecting, depowdering). Nonetheless, conventional binder solutions do not provide the green strength necessary to prevent damage and distortion to the printed part during the post-printing processes.

Accordingly, a need exists for alternative binders that provide increased printing speeds and improved green strength to the printed part during post-printing processes.

SUMMARY

Various embodiments of neat binders disclosed herein meet these needs by including a relatively high amount (e.g., greater than or equal to 93 wt %) of a monomer polymerized by a thermal initiator and at least one of a super acid generating initiator, a photo-thermal initiator, and a photoinitator, which increases printing speed and improves the green strength of the printed part.

According to a first aspect A1, a binder may comprise: greater than or equal to 93 wt % and less than or equal to 99.8 wt % of a monomer, the monomer comprising at least one of a difunctional monomer and a monofunctional monomer; greater than or equal to 0.1 wt % and less than or equal to 2 wt % of a thermal initiator; greater than or equal to 0.1 wt % and less than or equal to 3 wt % of at least one of a super acid generating initiator, a photo-thermal initiator, and a photoinitiator, and less than or equal to 1 wt % surfactant.

A second aspect A2 includes the binder according to the first aspect A1, wherein the monomer comprises monoacrylate monomers, diacrylate monomers, monovinyl ether monomers, divinyl ether monomers, monofunctional epoxy monomers, difunctional epoxy monomers, or combinations thereof.

A third aspect A3 includes the binder according to the second aspect A2, wherein the diacrylate monomers comprise neopentyl glycol propoxylate diacrylate, di(ethylene glycol) diacrylate, 1,6-hexanediol diacrylate, tri(propylene glycol) diacrylate, or combinations thereof.

A fourth aspect A4 includes the binder according to the second aspect A2 or third aspect A3, wherein the divinyl ether monomers comprise 1,4-cyclohexyldimethanol divinyl ether, diethylene glycol divinyl ether, triethylene glycol divinyl ether or combinations thereof.

A fifth aspect A5 includes the binder according any one of the second through fourth aspects A2-A4, wherein the epoxy monomers comprise 3,4-epoxycyclohexylmethyl 3,4-epoxycyclohexanecarboxylate; diglycidyl 1,2-cyclohexanedicarboxylate; 1,2,7,8-diepoxyoctane; dicyclopentadiene dioxide; 1,4-butanediol diglycidyl ether; glycidyl 2-methylphenyl ether; 1,2-epoxydodecane; or combinations thereof.

A sixth aspect A6 includes the binder according to any one of the first through fifth aspects A1-A5, wherein the thermal initiator comprises at least one of a radical based thermal initiator and a cationic based thermal initiator.

A seventh aspect A7 includes the binder according to any one of the first through sixth aspects A1-A6, wherein the thermal initiator has a thermal decomposition temperature greater than or equal to 40° C. and less than or equal to 150° C.

An eighth aspect A8 includes the binder according to the sixth aspect A6 or the seventh aspect A7, wherein the radical based thermal initiator comprises 2,2'-azobisisobutyronitrile; benzoyl peroxide; 1,1'-azobis(cyclohexanecarbonitrile); 4,4-azobis(4-cyanovaleric acid); tert-butyl peroxide; cumene hydroperoxide; tert-butyl peroxybenzoate; cyclohexanone peroxide; lauroyl peroxide; dicumyl peroxide; peracetic acid; 2,5-dimethyl-2,5-di-(2-ethylhexanoylperoxy) hexane; tert-amyl peroxypivalate; or combinations thereof.

A ninth aspect A9 includes the binder according to any one of the sixth through eight aspects A6-A8, wherein the cationic based thermal initiator comprises a blocked ammonium antimony hexafluoride catalyst, benzyl (4-hydroxyphenyl)methylsulfonium hexafluoroantimonate, diphenyl (methyl) sulfonium tetrafluoroborate, cyclohexyl p-toluenesulfonate, or combinations thereof.

A tenth aspect A10 includes binder according to any one of the sixth through ninth aspects A6-A9, wherein the thermal initiator comprises the radical based thermal initiator and the binder comprises the super acid generating initiator, the super acid generating initiator comprising aryl sulfonium salts, aryl iodonium salts, or combinations thereof.

An eleventh aspect A11 includes the binder according to any one of the sixth through ninth aspects A6-A9, wherein the thermal initiator comprises a radical based thermal initiator and the binder comprises the photo-thermal initiator, the photo-thermal initiator comprising iodonium salt-peroxide-iodonium salt triad, sulfonium salt-peroxide-sulfonium salt triad, or combinations thereof.

An twelfth aspect A12 includes the binder according to any one of the sixth through ninth aspects A6-A9, wherein the thermal initiator comprises a cationic based thermal initiator and the binder comprises the photoinitiator, the photoinitiator comprising a cationic based photoinitiator.

A thirteenth aspect A13 includes the binder according to the twelfth aspect A12, wherein the cationic based photoinitiator comprises aryl sulfonium salts, benzyl p-hydroxyphenyl methylsulfonium salts, aryl iodonium salts, cyclopentadienyl(p-cymene)ruthenium(II) hexafluorophosphate, ($\eta^6$-diphenylmethane) ($\eta^5$-cyclopentadienyl) iron hexafluorophosphate ($PhCH_2PhFe^+CpPF_6^-$), ($\eta^6$-benzophenone) ($\eta^5$-cyclopentadienyl) iron hexafluorophosphate ($PhCOPhFe^+CpPF_6^-$), or combinations thereof, or combinations thereof.

A fourteenth aspect A14 includes the binder according to any of the first through thirteenth aspects A1-A13, wherein the binder further comprises greater than or equal to 0 wt % and less than or equal to 3 wt % of a triplet sensitizer.

A fifteenth aspect A15 includes the binder according to any of the first through fourteenth aspects A1-A14, wherein the surfactant comprises tetramethyl decynediol (TMDD), oleic acid, or combinations thereof.

According to a sixteenth aspect A16, a method of manufacturing a part may comprise: depositing a layer of particulate material on a working surface; selectively applying a binder in at least one of an edge of the layer of particulate material and an infill pattern representative of a stress of the object, the binder comprising: greater than or equal to 0.1 wt % and less than or equal to 2 wt % of a thermal initiator; greater than or equal to 0.1 wt % and less than or equal to 3 wt % of at least one of a super acid generating initiator, a photo-thermal initiator, and a photoinitiator, and less than or equal to 1 wt % surfactant; repeating the steps of depositing and selectively applying to form a plurality of layers of particulate material with the applied binder; exposing the plurality of layers of particulate material with the applied binder to an excitation source to decompose the thermal initiator and initiate polymerization of the monomer to thereby form the green body part.

A seventeenth aspect A17 includes the method according to the sixteenth aspect A16, wherein the binder comprises the super acid generating initiator, and wherein the exposing step comprises exposing the plurality of layers of particulate material with the applied binder to ultraviolet light to decompose the super acid generating initiator and initiate polymerization of the monomer.

An eighteenth aspect A18 includes the method according to the sixteenth aspect A16, wherein the binder comprises the photo-thermal initiator, and wherein the exposing step comprises exposing the plurality of layers of particulate material with the applied binder to ultraviolet light to decompose the photo-thermal initiator and initiate polymerization of the monomer.

A nineteenth aspect A19 includes the method according to the sixteenth aspect A16, wherein the binder comprises the photoinitiator, and wherein the exposing step comprises exposing the plurality of layers of particulate material with the applied binder to ultraviolet light to decompose the photoinitiator and initiate polymerization of the monomer.

A twentieth aspect A20 includes the method according to any one of the sixteenth through nineteenth aspects A16-A19, wherein the exposing step comprises applying heat the plurality of layers of particulate material with the applied binder to decompose the thermal initiator and initiate polymerization of the monomer to thereby form the green body part.

A twenty-first aspect A21 includes the method according to the twentieth aspect A20, wherein applying heat comprises exposing the plurality of layers of particulate material with the applied binder to infrared light.

A twenty-second aspect A22 includes the method according to the twenty-first aspect A21, wherein applying heat comprises applying heat at a first temperature greater than or equal to 50° C. to the plurality of layers of particulate material to form the green body part, the green body part having a flexural strength greater than or equal to 9 MPa.

A twenty-third aspect A23 includes the method according to the twenty-second aspect A22, wherein the method further comprises applying heat at a second temperature greater than or equal to 75° C. to the green body part to further polymerize the monomer therein and increase the flexural strength of the green body part, the green body part having a flexural strength greater than or equal to 15 MPa.

According to a twenty-fourth aspect A24, a green body part may comprise: a plurality of layers of particulate material; and a polymer network formed from polymerization of a monomer, the monomer comprising at least one of a difunctional monomer and a monofunctional monomer, wherein the polymer network is located in at least one of an edge of the layer of particulate material and an infill pattern representative of a stress of the part.

A twenty-fifth aspect A25 includes the green body part according to the twenty-fourth aspect A24, wherein the polymer network is a crosslinked polymer network formed by the polymerization of at least one difunctional monomer and, optionally, at least one monofunctional monomer.

A twenty-sixth aspect A26 includes the green body part according to the twenty-fourth aspect A24, wherein the polymer network is a network of independent polymers formed from the polymerization of at least one monofunctional monomer.

A twenty-seventh aspect A27 includes the green body part according to the twenty-fourth aspect A24, wherein the polymer network is a first independent crosslinked polymer network formed from the polymerization of at least one difunctional monomer and, optionally, at least one monofunctional monomer, and a second polymer network of independent polymers formed from the polymerization of at least one monofunctional monomer.

Additional features and advantages of the embodiments disclosed herein will be set forth in the detailed description, which follows, and in part will be readily apparent to those skilled in the art from that description or recognized by practicing the disclosed embodiments as described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
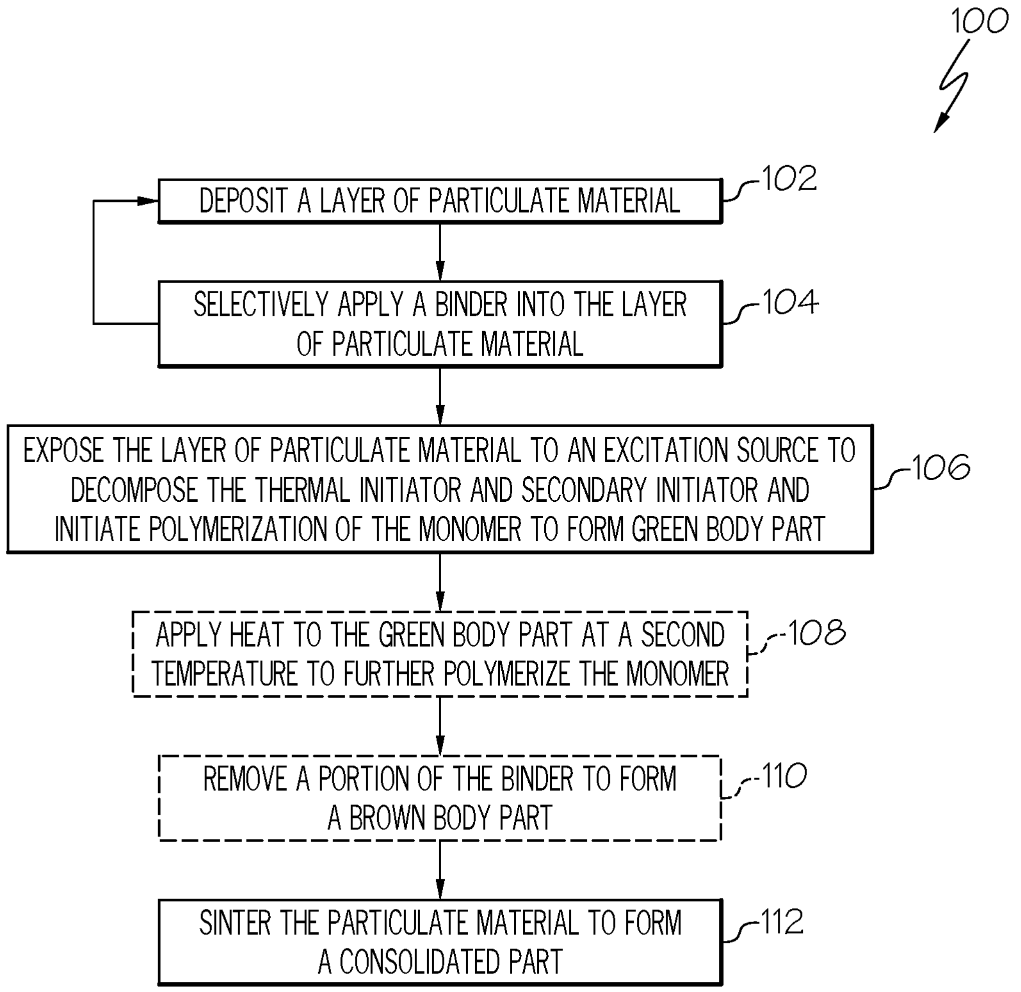
FIG. 1 is a flow diagram of an embodiment of a method of manufacturing a consolidated part via an additive manufacturing process using a binder comprising a monomer and an initiator according to one or more embodiments described herein.

Reference will now be made in detail to various embodiments of monomer and initiator containing binders for use in additive manufacturing.

In particular, various embodiments of binders comprise greater than or equal to 93 wt % and less than or equal to 99.8 wt % of a monomer, greater than or equal to 0.1 wt % and less than or equal to 2 wt % of a thermal initiator, and greater than or equal to 0.1 wt % and less than or equal to 3 wt % of at least one of a super acid generating initiator, a photo-thermal initiator, and a photoinitiator. The monomer comprises at least one of a difunctional monomer and a monofunctional monomer. Various embodiments of binders will be referred to herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The phrase "neat binder," as used herein, refers to a binder that does not include a solvent.

The phrase "green body part," as used herein, refers to a printed part prior to undergoing heat treatment to remove the print binder.

The phrase "brown body part," as used herein, refers to a printed part that has undergone a debinding heat treatment to remove at least a portion of the print binder.

The term "debinding," as used herein, refers to heating the coated green body to remove at least portion of the print binder to form a brown body part.

The phrase "thermoplastic polymer," as used herein, refers to a polymer having one or more polymer strands having functional groups that may interact with one another via weak non-covalent forces (e.g., interactions, bonds) to link, or otherwise couple, strands of each respective thermoplastic polymer to one another.

The phrase "weak non-covalent forces," as used herein, refers to hydrogen bonding, ionic bonding, Van der Waals forces, and the like having a bond or force strength greater than or equal to 1 kcal/mol and less than or equal to 7 kcal/mol.

The parameters "green body strength" and "brown body strength" of the parts, as discussed herein, are measured using a three-point flexural strength test in accordance with ASTM B312-14.

The phrase "thermal initiator," as used herein, refers to a compound that creates reactive species (i.e., free radicals, cations, or anions) upon exposure to heat.

The phrase "photoinitiator," as used herein, refers to a compound that creates reactive species (i.e., free radicals, cations, or anions) upon exposure to radiation (e.g., UV).

The phrase a "photo-thermal initiator," as used herein, refers to a compound or a mixture of compounds that creates reactive species (i.e., free radicals, cations, or anions) upon exposure to radiation (e.g., UV) and/or thermal (heat) and releases heat due to exothermic crosslinking of reactive monomers, which creates further reactive species and induces further crosslinking in the depth of layers.

The phrase "super acid generating initiator," as used herein, refers to a thermally or photochemically decomposable initiator that may produce a "super acid." A "super acid" refers to an acid with an acidity greater than that of 100% pure sulfuric acid, which has a Hammit acidity function ($H_0$) of −12.

The phrase "secondary initiator," as used herein, refers to at least one of a super acid generating initiator, a photo-thermal initiator, and a photoinitator.

Conventional print binder solutions may not enable increased printing speeds or provide the green strength necessary to prevent damage and distortion to the printed part during the post-printing processes. Specifically, conventional print binder solutions include a relatively high amount of solvent and a relatively lower amount of thermoplastic polymers. Relatively high amounts of solvent will take longer to evaporate during curing, which decreases printing speeds, thereby reducing output of the machine. Moreover, the strength of a green body part is provided by the print binder along with some contribution from particle friction and mechanical interlocking of the particles. The strength provided by the print binder is due to weak non-covalent forces formed between the thermoplastic polymer strands (e.g., as with polymeric binders). Relatively low amounts of thermoplastic polymer limit the green strength that may be achieved by the printed part and may lead to warping or even mechanical failure of the part.

In additive manufacturing processes including binder jetting, a print binder is jetted from a printer head onto successive layers of a print powder to join particles of a print powder to form a printed three-dimensional part. As discussed herein, in embodiments, it may be desirable to have a relatively higher printing speed. As further discussed herein, in embodiments, subsequent processing (e.g., debinding and sintering) may be needed to transform the printed three-dimensional part into a consolidated part. Accordingly, it may be desirable for the printed part to have a suitable green strength for handling (e.g., transferring, inspecting, depowdering). This reduces the occurrence of warping or part failure prior to consolidation, thereby improving manufacturing throughput and reducing manufacturing costs. Accordingly, various embodiments of binders disclosed herein include a relatively high amount (e.g., greater than or equal to 93 wt %) of a monomer polymerized by a thermal initiator and at least one of a super acid generating initiator, a photo-thermal initiator, and a photoinitator, which increases the amount of strength that the binder imparts to the green body part. Additionally, because the embodiments of binders disclosed herein are neat (i.e., do not include a solvent), the curing step may be reduced or eliminated, leading to increased printing speeds.

As set forth above, the binders described herein comprise a monomer, a thermal initiator, and at least one of a super acid generating initiator, a photo-thermal initiator, and a photoinitiator. The thermoplastic polymer that is formed through polymerization of the monomer in the presence of the initiator, imparts strength to the green body part by binding the particulate material and layers thereof. In embodiments, the formed thermoplastic polymer is selected from a class of thermoplastic polymers that generally decompose into small oligomers, carbon dioxide, and water without requiring the presence of oxygen. Accordingly, in embodiments, the resulting thermoplastic polymer may be cleanly and readily removed during debinding and sintering to generate a consolidated part that is substantially free of the binder and decomposition products (e.g., char and metal oxides).

In embodiments, the monomer includes at least one of a difunctional monomer and a monofunctional monomer. For example, in embodiments, the monomer includes at least one difunctional monomer that, when polymerized by the initiator, forms a crosslinked polymer network (e.g., thermoset product). In embodiments, the monomer includes at least one difunctional monomer and at least one monofunctional monomer that, when polymerized by the initiator, form a crosslinked polymer network (e.g., thermoset product). In embodiments, the monomer includes at least one monofunctional monomer that, when polymerized by the initiator, forms a network of independent polymers (e.g., thermoplastic product). In embodiments, the monomer includes both: (1) at least one difunctional monomer or at least one difunctional monomer and at least one monofunctional monomer; and (2) at least one monofunctional monomer that, when polymerized by the initiator, forms a first independent crosslinked polymer network and a second polymer network of independent polymers. The first independent crosslinked polymer network is composed of the at least one difunctional monomer or the at least one difunctional and the at least one monofunctional monomer (e.g., thermoset product). The second polymer network of independent polymers is composed of the at least one monofunctional monomer (e.g., thermoplastic product).

The selection of a difunctional monomer, monofunctional monomer, or combinations thereof may depend on the desired strength of the green body part and the acceptable amount of char after the binder is burned out. For example, in embodiments, a crosslinked polymer network imparts a relatively high strength to the green body part, but may result in a relatively high amount of char after being burned out due to the thermoset nature of the network. In embodiments, a network of independent polymers imparts a relatively lower amount of strength as compared to the crosslinked polymer network, but may result in a relatively low amount of char due to the thermoplastic nature of the network. In embodiments, a first independent crosslinked polymer network and a second polymer network of independent polymers imparts a relatively high strength to the green part and may result in a relatively moderate amount of char due to the differential burning of the crosslinked polymer network and network of independent polymers.

In embodiments, the monomer comprises, by way of example and not limitation, monoacrylate monomers, diacrylate monomers, monovinyl ether monomers, divinyl ether monomers, monofunctional epoxy monomers, monofunctional N-vinyl monomers, difunctional epoxy monomers, or combinations thereof. In embodiments, the diacrylate monomers comprise neopentyl glycol propoxylate diacrylate, di(ethylene glycol) diacrylate, 1,6-hexanediol diacrylate (HDDA), tri (propylene glycol) diacrylate, or combinations thereof. In embodiments, the epoxy monomers comprise 3,4-epoxycyclohexylmethyl 3,4-epoxycyclohexanecarboxylate; diglycidyl 1,2-cyclohexanedicarboxylate; 1,2,7,8-diepoxyoctane; dicyclopentadiene dioxide; 1,4-butanediol diglycidyl ether; glycidyl 2-methylphenyl ether; 1,2-epoxydodecane; or combinations thereof. In embodiments, the monovinyl ether monomers comprise ethyl VE, cyclohexyl VE, or combinations thereof. In embodiments, the divinyl ether (DVE) monomers comprise 1,4-cyclohexanedimethanol DVE, triethyelene glycol (TEG) DVE, diethyelene glycol (DEG) DVE, or combinations thereof. In embodiments, the monofunctional N-vinyl comprise acryloyl morpholine, cinyl methyl oxazolidinone, vinyl pyrrolidone, or combinations thereof.

In embodiments, the binder comprises a relatively high amount of monomer (e.g., greater than or equal to 93 wt %) such that the desired strength is imparted to the green body part. In embodiments, the binder comprises greater than or equal to 93 wt % and less than or equal to 99.8 wt % of the monomer, based on a total weight of the binder. In embodiments, the amount of monomer in the binder, based on a total weight of the binder, may be greater than or equal to greater than or equal to 93 wt %, greater than or equal to 93.5 wt %, greater than or equal to 95 wt %, greater than or equal to 94.5 wt %, greater than or equal to 95 wt %, greater than or equal to 95.5 wt %, greater than or equal to 96 wt %, greater than or equal to 96.5 wt %, greater than or equal to 97 wt %, greater than or equal to 97.5 wt %, greater than or equal to 98 wt %, greater than or equal to 98.5 wt %, greater than or equal to 99 wt %. In embodiments, the amount of monomer, based on a total weight of the binder, may be less than or equal to 99.8 wt %, less than or equal to 99.7 wt %, less than or equal to 99.6 wt %, or even less than or equal to 99.5 wt %. For example, the amount of monomer that may be in the binder, based on a total weight of the binder, may be greater than or equal to 93 wt % and less than or equal to 99.8 wt %, greater than or equal to 93 wt % and less than or equal to 99.7 wt %, greater than or equal to 93 wt % and less than or equal to 99.6 wt %, greater than or equal to 93 wt % and less than or equal to 99.5 wt %, greater than or equal to 93.5 wt % and less than or equal to 99.8 wt %, greater than or equal to 93.5 wt % and less than or equal to 99.7 wt %, greater than or equal to 93.5 wt % and less than or equal to 99.6 wt %, greater than or equal to 93.5 wt % and less than or equal to 99.5 wt %, greater than or equal to 94 wt % and less than or equal to 99.8 wt %, greater than or equal to 94 wt % and less than or equal to 99.7 wt %, greater than or equal to 94 wt % and less than or equal to 99.6 wt %, greater than or equal to 94 wt % and less than or equal to 99.5 wt %, greater than or equal to 94.5 wt % and less than or equal to 99.8 wt %, greater than or equal to 94.5 wt % and less than or equal to 99.7 wt %, greater than or equal to 94.5 wt % and less than or equal to 99.6 wt %, greater than or equal to 94.5 wt % and less than or equal to 99.5 wt %, greater than or equal to 95 wt % and less than or equal to 99.8 wt %, greater than or equal to 95 wt % and less than or equal to 99.7 wt %, greater than or equal to 95 wt % and less than or equal to 99.6 wt %, greater than or equal to 95 wt % and less than or equal to 99.5 wt %, greater than or equal to 95.5 wt % and less than or equal to 99.8 wt %, greater than or equal to 95.5 wt % and less than or equal to 99.7 wt %, greater than or equal to 95.5 wt % and less than or equal to 99.6 wt %, greater than or equal to 95.5 wt % and less than or equal to 99.5 wt %, greater than or equal to 96 wt % and less than or equal to 99.8 wt %, greater than or equal to 96 wt % and less than or equal to 99.7 wt %, greater than or equal to 96 wt % and less than or equal to 99.6 wt %, greater than or equal to 96 wt % and less than or equal to 99.5 wt %, greater than or equal to 96.5 wt % and less than or equal to 99.8 wt %, greater than or equal to 96.5 wt % and less than or equal to 99.7 wt %, greater than or equal to 96.5 wt % and less than or equal to 99.6 wt %, greater than or equal to 96.5 wt % and less than or equal to 99.5 wt %, greater than or equal to 97 wt % and less than or equal to 99.8 wt %, greater than or equal to 97 wt % and less than or equal to 99.7 wt %, greater than or equal to 97 wt % and less than or equal to 99.6 wt %, greater than or equal to 97 wt % and less than or equal to 99.5 wt %, greater than or equal to 97.5 wt % and less than or equal to 99.8 wt %, greater than or equal to 97.5 wt % and less than or equal to 99.7 wt %, greater than or equal to 97.5 wt % and less than or equal to 99.6 wt %, greater than or equal to 97.5 wt % and less than or equal to 99.5 wt %, greater than or equal to 98 wt % and less than or equal to 99.8 wt %, greater than or equal to 98 wt % and less than or equal to 99.7 wt %, greater than or equal to 98 wt % and less than or equal to 99.6 wt %, greater than or equal to 98 wt % and less than or equal to 99.5 wt %, greater than or equal to 98.5 wt % and less than or equal to 99.8 wt %, greater than or equal to 98.5 wt % and less than or equal to 99.7 wt %, greater than or equal to 98.5 wt % and less than or equal to 99.6 wt %, greater than or equal to 98.5 wt % and less than or equal to 99.5 wt %, greater than or equal to 99 wt % and less than or equal to 99.8 wt %, greater than or equal to 99 wt % and less than or equal to 99.7 wt %, greater than or equal to 99 wt % and less than or equal to 99.6 wt %, or even greater than or equal to 99 wt % and less than or equal to 99.5 wt %, or any and all sub-ranges formed from any of these endpoints.

The binder further includes a thermal initiator. The thermal initiator may impart a relatively higher strength to the green body part as compared to a conventional binder because the thermal initiator initiates polymerization in the deeper layers of particulate material as long as the thermal decomposition temperature of the thermal initiator is maintained (e.g., maintain threshold heat underneath the powder bed).

In embodiments, the thermal initiator has a thermal decomposition temperature greater than or equal to 40° C. and less than or equal to 150° C. In embodiments, the thermal initiator has a thermal decomposition temperature greater than or equal to 65° C. and less than or equal to 100° C. In embodiments, the thermal decomposition temperature of the thermal initiator may be greater than or equal to 40° C., greater than or equal to 50° C., greater than or equal to 60° C., or even greater than or equal to 65° C. In embodiments, the thermal decomposition temperature of the thermal initiator may be less than or equal to 150° C., less than or equal to 125° C., or even less than or equal to 100° C. For example, the thermal decomposition temperature of the thermal initiator may be greater than or equal to 40° C. and less than or equal to 150° C., greater than or equal to 40° C. and less than or equal to 125° C., greater than or equal to 40° C. and less than or equal to 100° C., greater than or equal to 50° C. and less than or equal to 150° C., greater than or equal to 50° C. and less than or equal to 125° C., greater than or equal to 50° C. and less than or equal to 100° C., greater than or equal to 60° C. and less than or equal to 150° C., greater than or equal to 60° C. and less than or equal to 125° C., greater than or equal to 60° C. and less than or equal to 100° C., greater than or equal to 65° C. and less than or equal to 150° C., greater than or equal to 65° C. and less than or equal to 125° C., or even greater than or equal to 65° C. and less than or equal to 100° C., or any and all sub-ranges formed from these endpoints.

In embodiments, the thermal initiator includes a radical based thermal initiator, a cationic based initiator, or combinations thereof. In embodiments, the radical based thermal initiator comprises 2,2'-azobisisobutyronitrile (AIBN); benzoyl peroxide, 1,1'-azobis(cyclohexanecarbonitrile) (ACHN); 4,4-azobis(4-cyanovaleric acid) (ACVA); tert-butyl peroxide; cumene hydroperoxide; tert-butyl peroxybenzoate; cyclohexanone peroxide; lauroyl peroxide; dicumyl peroxide; peracetic acid; or combinations thereof. In embodiments, the cationic based thermal initiator comprises a blocked ammonium antimony hexafluoride catalyst (e.g., K-PURE CXC-1612), benzyl(4-hydroxyphenyl)methylsulfonium hexafluoroantimonate, diphenyl(methyl)sulfonium tetrafluoroborate, cyclohexyl p-toluenesulfonate, 2,5-dimethyl-2,5-di-(2-ethylhexanoylperoxy) hexane (e.g., Luperox 256), tert-amyl peroxypivalate (e.g., Luperox 554), or combinations thereof.

In embodiments, the binder comprises greater than or equal to 0.1 wt % and less than or equal to 2 wt % of a thermal initiator, based on a total weight of the binder. In embodiments, the binder may comprise greater than or equal to 0.1 wt %, greater than or equal to 0.2 wt %, greater than or equal to 0.3 wt %, greater than or equal to 0.4 wt %, or even greater than or equal to 0.5 wt % of the thermal initiator, based on a total weight of the binder. In embodiments, the binder may comprise less than or equal to 2 wt %, less than or equal than or equal to 1.5 wt %, or even less than or equal to 1 wt % of the thermal initiator, based on a total weight of the binder. For example, the binder may comprise greater than or equal to 0.1 wt % and less than or equal to 2 wt %, greater than or equal to 0.1 wt % and less than or equal to 1.5 wt %, greater than or equal to 0.1 wt % and less than or equal to 1 wt %, greater than or equal to 0.2 wt % and less than or equal to 2 wt %, greater than or equal to 0.2 wt % and less than or equal to 1.5 wt %, greater than or equal to 0.2 wt % and less than or equal to 1 wt %, greater than or equal to 0.3 wt % and less than or equal to 2 wt %, greater than or equal to 0.3 wt % and less than or equal to 1.5 wt %, greater than or equal to 0.3 wt % and less than or equal to 1 wt %, greater than or equal to 0.4 wt % and less than or equal to 2 wt %, greater than or equal to 0.4 wt % and less than or equal to 1.5 wt %, greater than or equal to 0.4 wt % and less than or equal to 1 wt %, greater than or equal to 0.5 wt % and less than or equal to 2 wt %, greater than or equal to 0.5 wt % and less than or equal to 1.5 wt %, or even greater than or equal to 0.5 wt % and less than or equal to 1 wt %, or any and all sub-ranges formed from any of these endpoints, of the thermal initiator, based on a total weight of the binder.

In embodiments, in addition to a thermal initiator, the initiator may comprise a photoinitiator. The combination of a thermal initiator and photoinitiator (i.e., physical mixture of separate initiator molecules) may impart a relatively higher strength to the green body part as compared to a conventional binder or a binder that only includes a thermal initiator. In embodiments, the combination of a thermal initiator and a photoinitiator may be initiated by ultraviolet light, heat, or a combination thereof. For example, application of ultraviolet light may excite the photoinitiator and initiate polymerization in the upper layers (e.g., layers located 1 μm to 250 μm into the thickness of particulate material as measured from a top surface of the particulate material) of particulate material and application of heat may excite the thermal initiator and initiate polymerization in the deeper layers (e.g., layers located 250 μm to 75 cm into thickness of particulate material as measured from a top surface of the particulate material) of particulate material, thereby imparting strength throughout the green body part and resulting in a relatively higher amount of green strength as compared to a conventional binder or a binder that only includes a thermal initiator. In other embodiments, application of ultraviolet light may excite the photoinitiator and initiate polymerization in the upper layers of particulate material. The crosslinking of monomers in the upper layers may generate enough thermal energy to be above the thermal decomposition temperature of the thermal initiator such that the thermal initiator decomposes and initiates polymerization in the deeper layers of particulate material without external heat being applied. In embodiments, the photoinitiator enables a relatively quick polymerization and stiffening of the upper layers to aid faster recoating while the thermal initiator enables polymerization in the deeper layers while print process is continuing.

In embodiment, the photoinitiator includes a cationic based photoinitiator. In embodiments, the cationic based photoinitiator includes, by way of example and not limitation, aryl sulfonium salts, benzyl p-hydroxyphenyl methylsulfonium salts, aryl iodonium salts (e.g., diphenyliodonium hexafluoroantimonate salt or bis(4-tert-butylphenyl)iodonium hexafluorophosphate), cyclopentadienyl(p-cymene)ruthenium(II) hexafluorophosphate, ($\eta^6$-diphenylmethane) ($\eta^5$-cyclopentadienyl) iron hexafluorophosphate ($PhCH_2PhFe^+CpPF_6^-$), ($\eta^6$-benzophenone) ($\eta^5$-cyclopentadienyl) iron hexafluorophosphate ($PhCOPhFe^+CpPF_6^-$), or combinations thereof.

In embodiments, in addition to a thermal initiator, the initiator may comprise a super acid generating initiator. The combination of a thermal initiator and a super acid generating initiator may impart a relatively higher strength to the green body part as compared to a conventional binder or a binder that only includes a thermal initiator. In embodiments, the combination of a thermal initiator and a super acid generating initiator may be initiated by ultraviolet light, heat, or a combination thereof. For example, application of ultraviolet light may excite the super acid generating initiator and initiate polymerization in the upper layers (e.g., layers located 1 μm to 250 μm into the thickness of particulate material as measured from a top surface of the particulate material) of particulate material and application of heat decomposes the thermal initiator and initiate polymerization in the deeper layers (e.g., layers located 250 μm to 75 cm into thickness of particulate material as measured from a top surface of the particulate material) of particulate material, thereby imparting strength throughout the green body part and resulting in a relatively higher amount of green strength as compared to a conventional binder or a binder that only includes a thermal initiator. In other embodiments, application of ultraviolet light may excite the super acid generating initiator and initiate polymerization in the upper layers of particulate material. The crosslinking of monomers in the upper layers may generate enough thermal energy to be above the thermal decomposition temperature of the thermal initiator such that the thermal initiator decomposes. The decomposition of the thermal initiator may not only initiate polymerization of the surrounding monomer, but also may decompose the super acid generating initiator, thereby forming a super acid product (e.g, $HSbF_6$). The super acid product may further initiate polymerization of the monomers in the deeper layers of particulate material. The tendency of a super acid to crosslink surrounding monomers at a relatively faster pace generate excess heat (i.e., exotherm energy), and initiates polymerization and crosslinking in the deeper layers of particulate material without external heat being applied. In embodiments, the super acid generating initiator enables a relatively quick polymerization and stiffening of the upper layers to aid faster recoating while the thermal initiator enables polymerization in the deeper layers while print process is continuing.

In embodiments, the super acid generating initiator includes, by way of example and not limitation, aryl sulfonium salts, aryl iodonium salts (e.g., diphenyliodonium hexafluoroantimonate salt, benzyl p-hydroxyphenyl methylsulfonium salts), or combinations thereof.

In embodiments, in addition to a thermal initiator, the initiator may comprise a photo-thermal initiator. The combination of a thermal initiator and a photo-thermal initiator may impart a relatively higher strength to the green body part as compared to a conventional binder or a binder that only includes a thermal initiator as a combination of cationic photopolymerization and radical thermal polymerization monomers may be employed. In embodiments, the combination of a thermal initiator and a photoinitiator may be initiated by ultraviolet light, heat, or a combination thereof. For example, application of ultraviolet light may excite the photo-thermal initiator and initiate polymerization in the upper layers (e.g., layers located 1 μm to 250 μm into the thickness of particulate material as measured from a top surface of the particulate material) of particulate material and application of heat may excite the photo-thermal initiator and/or the thermal initiator and initiate polymerization in the deeper layers (e.g., layers located 250 μm to 75 cm into thickness of particulate material as measured from a top surface of the particulate material) of particulate material, thereby imparting strength throughout the green body part and resulting in a relatively higher amount of green strength as compared to a conventional binder or a binder that only includes a thermal initiator. In other embodiments, application of ultraviolet light may excite the photo-thermal initiator and initiate polymerization in the upper layers of particulate material. The crosslinking of monomers in the upper layers may generate enough thermal energy to be above the thermal decomposition temperature of the photo-thermal initiator and the thermal initiator such that the photo-thermal initiator and the thermal initiator decomposes and initiates polymerization in the deeper layers of particulate material without external heat being applied. In other embodiments, heat may be applied without the application of ultraviolet light to decompose the photo-thermal initiator and/or thermal initiator and initiate polymerization in the upper layers of particulate material. This decomposition of the photo-thermal initiator and/or thermal initiator may also release heat to cause the temperature in deeper layers to exceed the thermal decomposition temperature of the photo-thermal initiator and/or thermal initiator, which further decomposes the photo-thermal initiator and/or thermal initiator and initiates polymerization in the deeper layers of particulate material. In embodiments where the decomposition of the photo-thermal initiator and/or thermal initiator does not result in enough heat to exceed the thermal decomposition temperature of the photo-thermal initiator and/or thermal initiator, further heat may be applied at a greater temperature. In embodiments, the photoinitiator enables a relatively quick polymerization and stiffening of the upper layers to aid faster recoating while the thermal initiator enables polymerization in the deeper layers while print process is continuing.

In embodiments, the initiator comprises a photo-thermal initiator without a thermal initiator. Similar to the combination of a thermal initiator and photoinitiator, a photo-thermal initiator may impart a relatively higher strength to the green body part as compared to a conventional binder or a binder that only includes a thermal initiator. In particular, when exposed to an excitation source (e.g., ultraviolet light), the photo-thermal initiator decomposes and initiates polymerization in the upper layers of particulate material. The decomposition of the photo-thermal initiator also releases heat, which further decomposes the photo-thermal initiator and initiates polymerization in the deeper layers of particulate material, thereby imparting strength throughout the green body part and resulting in a relatively higher amount of overall strength.

In embodiments, the photo-thermal initiator comprises a diad type molecule (e.g., photoinitiator covalently attached to a thermal initiator) or a triad type molecule (e.g., 2 photoinitiators are attached to two ends of a thermal initiator). In embodiments, the photo-thermal initiator comprises a cationic based photo-thermal initiator. In embodiments, the photo-thermal initiator includes, by way of example and not limitation, iodonium salt-peroxide-iodonium salt triad, sulfonium salt-peroxide-sulfonium salt triad, or combinations thereof.

In embodiments, the initiator comprises a radical based thermal initiator and a super acid generating initiator.

In embodiments, the initiator comprises a radical based thermal initiator and a cationic based photo-thermal initiator.

In embodiments, the initiator comprises a cationic based thermal initiator and a cationic based photoinitiator.

In embodiments, the binder comprises greater than or equal to 0.1 wt % and less than or equal to 3 wt % of at least one of a super acid generating initiator, a photo-thermal initiator, and a photoinitator, based on a total weight of the binder. In embodiments, the binder may comprise greater than or equal to 0.1 wt %, greater than or equal to 0.2 wt %, greater than or equal to 0.3 wt %, greater than or equal to 0.4 wt %, or even greater than or equal to 0.5 wt % of at least one of a super acid generating initiator, a photo-thermal initiator, and a photoinitator, based on a total weight of the binder. In embodiments, the binder may comprise less than or equal to 3 wt %, less than or equal to 2.5 wt %, less than or equal to 2 wt %, less than or equal to 1.5 wt %, or even less than or equal to 1 wt % of at least one of a super acid generating initiator, a photo-thermal initiator, and a photoinitator, based on a total weight of the binder. For example, the binder may comprise greater than or equal to 0.1 wt % and less than or equal to 3 wt %, greater than or equal to 0.1 wt % and less than or equal to 2.5 wt %, greater than or equal to 0.1 wt % and less than or equal to 2 wt %, greater than or equal to 0.1 wt % and less than or equal to 1.5 wt %, greater than or equal to 0.1 wt % and less than or equal to 1 wt %, greater than or equal to 0.2 wt % and less than or equal to 3 wt %, greater than or equal to 0.2 wt % and less than or equal to 2.5 wt %, greater than or equal to 0.2 wt % and less than or equal to 2 wt %, greater than or equal to 0.2 wt % and less than or equal to 1.5 wt %, greater than or equal to 0.2 wt % and less than or equal to 1 wt %, greater than or equal to 0.3 wt % and less than or equal to 3 wt %, greater than or equal to 0.3 wt % and less than or equal to 2.5 wt %, greater than or equal to 0.3 wt % and less than or equal to 2 wt %, greater than or equal to 0.3 wt % and less than or equal to 1.5 wt %, greater than or equal to 0.3 wt % and less than or equal to 1 wt %, greater than or equal to 0.4 wt % and less than or equal to 3 wt %, greater than or equal to 0.4 wt % and less than or equal to 2.5 wt %, greater than or equal to 0.4 wt % and less than or equal to 2 wt %, greater than or equal to 0.4 wt % and less than or equal to 1.5 wt %, greater than or equal to 0.4 wt % and less than or equal to 1 wt %, greater than or equal to 0.5 wt % and less than or equal to 3 wt %, greater than or equal to 0.5 wt % and less than or equal to 2.5 wt %, greater than or equal to 0.5 wt % and less than or equal to 2 wt %, greater than or equal to 0.5 wt % and less than or equal to 1.5 wt %, or even greater than or equal to 0.5 wt % and less than or equal to 1 wt %, or any and all sub-ranges formed from any of these endpoints, of at least one of a super acid generating initiator, a photo-thermal initiator, and a photoinitator, based on a total weight of the binder.

In embodiments, the binder may further comprise a surfactant to dissolve the monomer and initiator. In embodiments, the surfactant may comprise, by way of example and not limitation, tetramethyl decynediol (TMDD) (e.g., TMDD 50% and TMDD 100%), oleic acid, or combinations thereof.

In embodiments, the binder comprises less than 1 wt % of the surfactant, based on a total weight of the binder. In embodiments, the binder may comprise less than or equal to 1 wt %, less than or equal to 0.8 wt %, less than or equal to 0.6 wt %, or even less than or equal to 0.4 wt % of the surfactant, based on a total weight of the binder. In embodiments, the binder may comprise greater than or equal 0 wt %, greater than 0 wt %, greater than or equal to 0.1 wt %, or even greater than or equal to 0.2 wt % of the surfactant, based on a total weight of the binder. For example, the binder may comprise greater than or equal to 0 wt % and less than or equal to 1 wt %, greater than or equal to 0 wt % and less than or equal to 0.8 wt %, greater than or equal to 0 wt % and less than or equal to 0.6 wt %, greater than or equal to 0 wt % and less than or equal to 0.4 wt %, greater than 0 wt % and less than or equal to 1 wt %, greater than 0 wt % and less than or equal to 0.8 wt %, greater than 0 wt % and less than or equal to 0.6 wt %, greater than 0 wt % and less than or equal to 0.4 wt %, greater than or equal to 0.1 wt % and less than or equal to 1 wt %, greater than or equal to 0.1 wt % and less than or equal to 0.8 wt %, greater than or equal to 0.1 wt % and less than or equal to 0.6 wt %, greater than or equal to 0.1 wt % and less than or equal to 0.4 wt %, greater than or equal to 0.2 wt % and less than or equal to 1 wt %, greater than or equal to 0.2 wt % and less than or equal to 0.8 wt %, greater than or equal to 0.2 wt % and less than or equal to 0.6 wt %, or even greater than or equal to 0.2 wt % and less than or equal to 0.4 wt %, or any and all sub-ranges formed from any of these endpoints, of the surfactant, based on a total weight of the binder.

In embodiments, the binder may optionally include a sensitizer to enable of ease excitation within the visible UV, UV-Vis and Visible spectrum of light greater than 385 nm and energy transfer to a deep UV photoinitiator such as a diaryliodonium hexafluoroantimonate salt (e.g., OMAN71). In embodiments, the sensitizer may comprise, by way of example and not limitation, 2-isopropylthioxanthene-9-one (ITX), benzophenone, nitro-benzophenone, anthracene, diphenylanthracene, perylene and other derivatives, metal-ligand complexes (e.g., ruthenium(II)polypyridyl complexes), or combinations thereof. In embodiments, the binder may comprise greater than or equal to 0 wt % or even greater than or equal to 0.05 wt % of the sensitizer, based on a total weight of the binder. In embodiments, the binder may comprise less than or equal less than or equal to 2 wt %, less than or equal to 1 wt % to 0.5 wt %, less than or equal to 0.3 wt %, or even less than or equal to 0.1 wt % of the sensitizer, based on a total weight of the binder. For example, the binder may comprise greater than or equal to 0 wt % and less than or equal to 2 wt %, greater than or equal to 0 wt % and less than or equal to 1 wt %, greater than or equal to 0 wt % and less than or equal to 0.5 wt %, greater than or equal to 0 wt % and less than or equal to 0.3 wt %, greater than or equal to 0 wt % and less than or equal to 0.1 wt %, greater than 0 wt % and less than or equal to 0.5 wt %, greater than 0 wt % and less than or equal to 0.3 wt %, greater than 0 wt % and less than or equal to 0.1 wt %, greater than or equal to 0.05 wt % and less than or equal to 2 wt %, greater than or equal to 0.05 wt % and less than or equal to 1 wt %, greater than or equal to 0.05 wt % and less than or equal to 0.5 wt %, greater than or equal to 0.05 wt % and less than or equal to 0.3 wt %, or even greater than or equal to 0.05 wt % and less than or equal to 0.1 wt %, or any and all sub-ranges formed from any of these endpoints of the sensitizer, based on a total weight of the binder.

In embodiments, the binder may optionally include a triplet sensitizer such as, by way of example and not limitation, 2-isopropylthioxanthene-9-one (ITX), benzophenone, nitro-benzophenone, anthracene, diphenylanthracene, perylene and other derivatives, metal-ligand complexes (e.g., ruthenium(II)polypyridyl complexes), or combinations thereof.

Referring now to FIG. 1, a method of manufacturing a consolidated part via additive manufacturing using the binder according to embodiments described herein is shown at 100. To facilitate discussion of aspects of the method 100, reference is also made to FIG. 2, which is a block diagram depicting an embodiment of an additive manufacturing apparatus 120 that may be used to perform the method 100. The method 100 begins at block 102 with depositing a layer 122 of a particulate material 124 (e.g., creating a powder bed), as shown in FIG. 3, on a working surface. In embodiments, the layer 122 may have a thickness 126 greater than or equal to 10 microns (μm) and less than or equal to 200 μm. The particulate material 124 used to print the part may vary depending on the type of part and the end use of the part.

In particular, the particulate material 124 may include a metal particulate material, such as a nickel alloy (e.g., Inconel 625, Inconel 718, Rene'108, Rene'80, Rene'142, Rene'195, and Rene'M2, Marm-247), a cobalt alloy (e.g., Hans 188, L605, X40, X45, and FSX414), a cobalt-chromium alloy, a titanium alloy, an aluminum alloy, a tungsten alloy, a stainless steel alloy (e.g., SS316L, SS304, Alloy Steel 8620, Alloy Steel 4140, Alloy 17-4PH, Stainless Steel 300 Series, Stainless Steel 400 Series), copper, a copper-nickel alloy, or a combination thereof. In embodiments, the metal particulate material may comprise particles having a particle size distribution greater than or equal to 1 microns (μm) and less than or equal to 75 μm. Such particulate materials may be used to print metal articles including, by way of example and not limitation, fuel tips, fuel nozzles, shrouds, micro mixers, or turbine blades.

In embodiments, the particulate material 124 may include a ceramic particulate material, such as alumina, aluminum nitride, zirconia, titania, silica, silicon nitride, silicon carbide, boron nitride, or a combination thereof. In embodiments, the ceramic particulate material may comprise particles having a particle size distribution greater than or equal to 0.1 μm to less than and equal to 100 μm. Such particulate materials may be used to print ceramic articles for use in, by way of example and not limitation, the medical and transportation industries.

Referring back to FIG. 1 at block 104, following the deposition of particulate material 124, the method 100 continues with selectively depositing a binder into a portion of the layer 122 according to a pattern. For example, the binder may be selectively printed into the layer 122 of particulate material 124 using a print head that is operated by a controller based on a CAD design that includes a representation of a layer of the consolidated part being printed.

Figure 2:
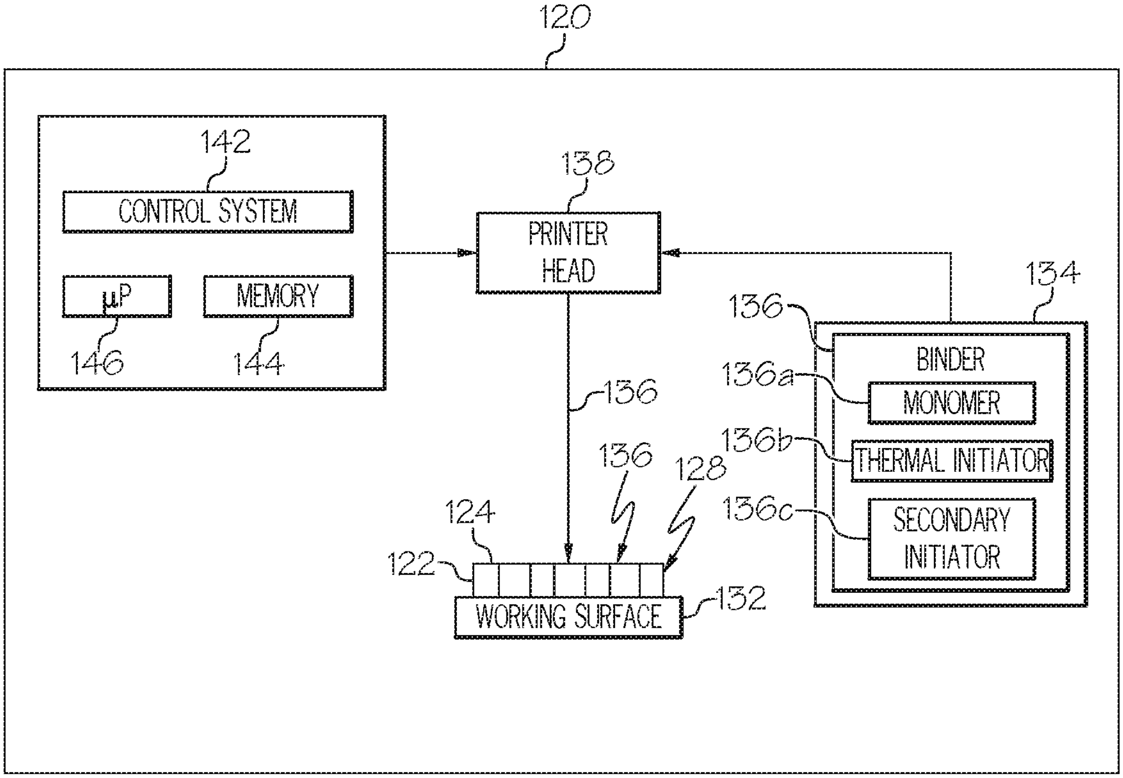
FIG. 2 is a block diagram of an embodiment of an additive manufacturing apparatus used to manufacture the consolidated part in accordance with the method of FIG. 1.
Figure 3:
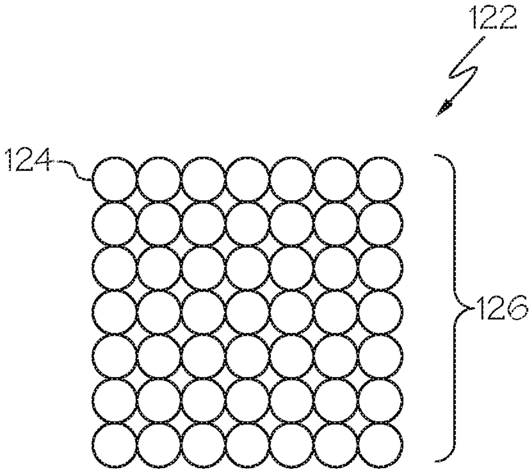
FIG. 3 is a schematic diagram of an embodiment of a layer of particulate material from which the consolidated part is manufactured resulting from the acts of the method of FIG. 1.

For example, as shown in FIG. 2, the additive manufacturing apparatus 120 may be a binder jet printer that selectively deposits the binder into the layer 122 according to the acts of block 104 (FIG. 1). In embodiments, the additive manufacturing apparatus 120 may include a working surface 132 that supports the layer 122 of particulate material 124, a reservoir 134 that stores a binder 136, and a printer head 138 that is fluidly coupled to the reservoir 134. The printer head 138 selectively deposits the binder 136 into the layer 122 of particulate material 124 to print the binder 136 onto and into the layer 122 in a pattern that is representative of a layer of the consolidated part being printed. In embodiments, the additive manufacturing apparatus 120 may include a control system 142 for controlling operation of the additive manufacturing apparatus 120. The control system 142 may include a distributed control system (DCS) or any computer-based workstation that is fully or partially automated. In embodiments, the control system 142 may be any suitable device employing a general purpose computer or an application-specific device, which may generally include memory circuitry 144 storing one or more instructions for controlling operation of the additive manufacturing apparatus 120 and a processor. The memory circuitry 144 may store CAD designs representative of a structure of the consolidated part being printed. The processor may include one or more processing devices (e.g., microprocessor 146), and the memory circuitry 144 may include one or more tangible, non-transitory, machine-readable media collectively storing instructions executable by the processer to control actions described herein.

The binder 136 deposited into the layer of material may be, for example, any one of the embodiments of the binder described herein, comprising a monomer 136*a*, a thermal initiator 136*b*, and a secondary initiator 136*c* (i.e., at least one of a super acid generating initiator, a photo-thermal initiator, and a photoinitator).

In embodiments, the binder 136 is deposited on the layer 122 of particulate material 124 at less than all locations (e.g., an edge and/or in an infill pattern) at which the particulate material 124 is sintered to form the final part. In particular, the relatively high amount of monomer 136*a* in the binder 136 decreases the porosity of the layer 122 of particulate material 124, which makes it more difficult to burn off the binder 136 during the debinding step. Because of the relatively high amount of strength imparted by the binders described herein, the binder 136 may be applied to the layer 122 of particulate material 124 in a manner that provides a sufficient level of porosity to allow for binder burnout while imparting to the desired level of strength to the green body part. Accordingly, the application of the binder 136 in an edge and/or in an infill pattern as described herein may lead to green body parts having improved green strength while maintaining or reducing the debinding time as compared to conventional printing methods in which binder is deposited uniformly throughout the green body part.

Figure 4:
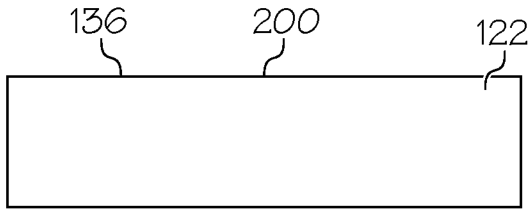
FIG. 4 is a schematic cross-section of a region of a part in which binder is deposited at an edge of the part according to one or more embodiments shown and described herein.
Figure 5:
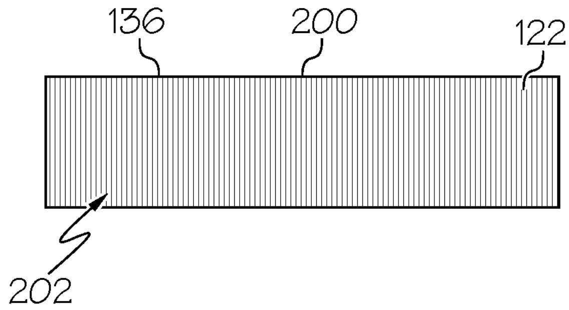
FIG. 5 is a schematic cross-section of a region of a part in which binder is deposited according to a predetermined pattern according to one or more embodiments shown and described herein.
Figure 6:
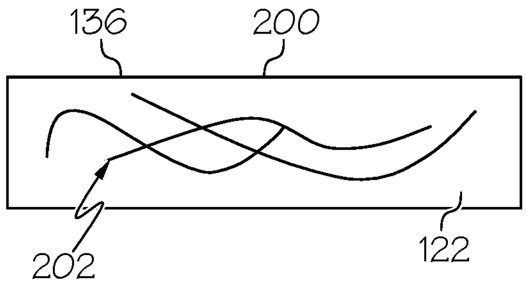
FIG. 6 is a schematic cross-section of a region of a part in which binder is deposited according to another predetermined pattern according to one or more embodiments shown and described herein.
Figure 7:
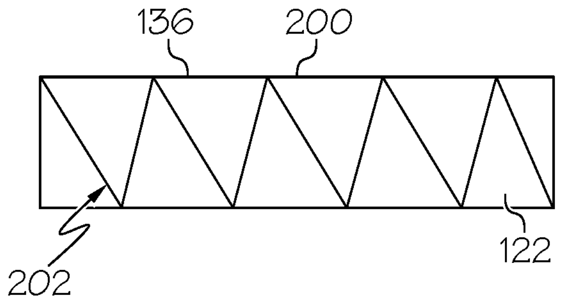
FIG. 7 is a schematic cross-section of a region of a part in which binder is deposited according to another predetermined pattern according to one or more embodiments shown and described herein.

In particular, the binder 136 may be selectively applied in at least one of an edge of the layer 122 of particulate material 124 and an infill pattern representative of a stress of the object being manufactured. For example, as illustrated in FIG. 4, the binder 136 may be deposited at locations corresponding to an edge boundary 200 of the object. As illustrated in FIGS. 5-7, the binder 136 may be deposited in the layer 122 in a predetermined pattern 204 that is selected at least in part on a stress on the object being manufactured prior to consolidation. For example, in FIGS. 5 and 7, the binder 136 may be deposited in the form of lines in the layer 122, which may provide additional support for load handling. Alternatively, as shown in FIG. 6, the binder 136 may be deposited to form areas of bound particulate material at various locations of the layer 122. Additional information regarding the selection of the predetermined pattern can be found in, for example, the entire contents of which is hereby incorporated by reference.

After the binder 136 is selectively deposited into the layer 122 of particulate material 124, the binder 136 at least partially coats an outer surface of the particulate material, thereby generating binder-coated particles 128. As will be described, the binder bonds the binder-coated particles 128 according to the pattern of the binder 136 printed into the layer 122 of particular material 124 to form a layer of the green body part.

The method 100 may repeat the acts of blocks 102 and 104 to continue building up the part in a layer-by-layer manner until a desired number of layers 122 have been printed.

Following the deposition of the layers 122 of particulate material 124 and printing of the binder 136 as set forth in blocks 102 and 104 of FIG. 1, the method continues at block 106 with exposing the plurality of layers of 122 of particulate material 124 with the applied binder 136 to an excitation source to decompose the thermal initiator 136*b* and the secondary initiator 136*c* and initiate polymerization of the monomer to thereby form the green body part.

In embodiments, the binder comprises a thermal initiator (e.g., radical based thermal initiator or cationic based thermal initiator) and the excitation source comprises heat and the exposing step comprises applying heat to the plurality of layers 122 of particulate material 124 to thereby form the green body part. In particular, the application of heat decomposes the thermal initiator and initiates polymerization in deeper layers 122 (e.g., layers located 250 μm to 75 cm into thickness of particulate material as measured from a top surface of the particulate material) of the particulate material and forms a polymer network that imparts strength (e.g., in the form of chemical cross-links) to the deeper layers 122 of particulate material 124.

In embodiments where the binder comprises a thermal initiator and a photoinitiator (e.g., cationic based photoinitiator combined with radical based thermal initiator or cationic based thermal initiator), the excitation source comprises ultraviolet light and heat and the exposing step comprises exposing the plurality of layers 122 of particulate material 124 with the applied binder 136 to ultraviolet light and applying heat to the plurality of layers 122 of particulate material 124. The exposure to ultraviolet light decomposes the photoinitiator and initiates polymerization of the monomer in the upper layers 122 (e.g., layers located 1 μm to 250 μm into the thickness of particulate material as measured from a top surface of the particulate material) of particulate material 124 to form a polymer network that imparts strength (e.g., in the form of chemical cross-links) to the upper layers 122 of particulate material 124. Applying heat to the plurality of layers 122 of particulate material 124 with the applied binder 136 decomposes the thermal initiator and further polymerizes the monomer to thereby form a green body part. In particular, application of heat decomposes the thermal initiators and initiates polymerization in deeper layers 122 (e.g., layers located 250 μm to 75 cm into thickness of particulate material as measured from a top surface of the particulate material) of the particulate material 124 and furthers the formation of the polymer network that imparts strength to the deeper layers 122 of particulate material 124. In embodiments, the exposure to ultraviolet light and the application of heat occur in a single step. In embodiments, the exposure to ultraviolet light and the application of heat occur sequentially. In embodiments, excitation source may comprise ultraviolet light and not heat. For example, the crosslinking of monomers in the upper layers of particulate material caused by the application of ultraviolet light may generate enough thermal energy to be above the thermal decomposition temperature of the thermal initiator such that the thermal initiator decomposes and initiates polymerization in the deeper layers of particulate material without external heat being applied.

In embodiments where the binder comprises a thermal initiator (e.g., radical based thermal initiator) and a super acid generating initiator, the excitation source comprises ultraviolet light and/or heat and the exposing step comprises exposing the plurality of layers 122 of particulate material 124 with the applied binder 136 to heat to thereby form the green body part. In particular, the application of ultraviolet light decomposes the super acid generating initiator and initiates polymerization in the upper layers 122 of particulate material 124 and the application of heat decomposes the thermal initiator and initiates polymerization in the deeper layers 122 of particulate material 124. In other embodiments, only ultraviolet light may be applied to decompose the super acid generating initiator and initiate polymerization in the upper layers 122 of particulate material 124. The decomposition of the super acid generating initiator may also release heat to cause the temperature in deeper layers to exceed the thermal decomposition temperature of the thermal initiator, which decomposes the thermal initiator and initiates polymerization in the deeper layers 122 of particulate material 124. In other embodiments, only heat may be applied to decompose the thermal initiator and initiate polymerization in the deeper layers 122 of particulate material 124. The decomposition of the thermal initiator may not only initiate polymerization of the surrounding monomer, but also may decompose the super acid generating initiator, thereby forming a super acid product (e.g, $HSbF_6$). The super acid product may further initiate polymerization of the monomers in the deeper layers 122 of particulate material 124. In embodiments where the decomposition of the super acid generating initiator and/or thermal initiator does not result in enough heat to exceed the thermal decomposition temperature of the photo-thermal initiator and/or thermal initiator, further heat may be applied at a greater temperature.

In embodiments where the binder comprises a photo-thermal initiator (e.g., cationic based photo-thermal initiator), the excitation source comprises ultraviolet light and the exposing step comprises exposing the plurality of layers 122 of particulate material 124 with the applied binder 136 to ultraviolet light to thereby form the green body part. In particular, the application of ultraviolet light decomposes the photo-thermal initiator and initiates polymerization in the upper layers 122 of particulate material 124, which releases heat to cause the temperature in deeper layers to exceed the thermal decomposition temperature of the photo-thermal initiator. This drives the chemical crosslinking of the remaining monomers without relying on external heat sources to maintain the powder bed temperature at the thermal decomposition temperature.

In embodiments, applying heat comprises exposing the plurality of layers 122 of particulate material 124 with the applied binder 136 to infrared light.

In embodiments, the heat is applied to the plurality of layers 122 of particulate material 124 at a first temperature greater than or equal to 50° C., greater than or equal to 60° C., or even greater than or equal to 70° C. In embodiments, the heat is applied at a first temperature less than or equal to 150° C., less than or equal to 125° C., or even less than or equal to 100° C. For example, the first temperature may be greater than or equal to 50° C. and less than or equal to 150° C., greater than or equal to 50° C. and less than or equal to 125° C., greater than or equal to 50° C. and less than or equal to 100° C., greater than or equal to 60° C. and less than or equal to 150° C., greater than or equal to 60° C. and less than or equal to 125° C., greater than or equal to 60° C. and less than or equal to 100° C., greater than or equal to 70° C. and less than or equal to 150° C., greater than or equal to 70° C. and less than or equal to 125° C., or even greater than or equal to 70° C. and less than or equal to 100° C.

In embodiments, the green body part may have a flexural strength greater than or equal to 9 MPa, greater than or equal to 10 MPa, greater than or equal to 11 MPa, or even greater than or equal to 12 MPa. In embodiments, the green body part may have a flexural strength less than or equal 20 MPa, less than or equal to 18 MPa, or less than or equal to 16 MPa. In embodiments, the green body part may have a flexural strength greater than or equal to 9 MPa and less than or equal to 20 MPa, greater than or equal to 9 MPa and less than or equal to 18 MPa, greater than or equal to 9 MPa and less than or equal to 16 MPa, greater than or equal to 10 MPa and less than or equal to 20 MPa, greater than or equal to 10 MPa and less than or equal to 18 MPa, greater than or equal to 10 MPa and less than or equal to 16 MPa, greater than or equal to 11 MPa and less than or equal to 20 MPa, greater than or equal to 11 MPa and less than or equal to 18 MPa, greater than or equal to 11 MPa and less than or equal to 16 MPa, greater than or equal to 12 MPa and less than or equal to 20 MPa, greater than or equal to 12 MPa and less than or equal to 18 MPa, or even greater than or equal to 12 MPa and less than or equal to 16 MPa, or any and all sub-ranges formed from these endpoints.

Referring back to FIG. 1, the method 100 may optionally include step 108, applying heat at a second temperature greater than or equal to 75° C. to the green body part to further polymerize the monomer therein and further increase the flexural strength of the green body part. In embodiments, the heat is applied to the green body part at a second temperature greater than or equal to 75° C., greater than or equal to 85° C., or even greater than or equal to 85° C. In embodiments, the heat is applied at a first temperature less than or equal to 200° C., less than or equal to 150° C., or even less than or equal to 100° C. For example, the first temperature may be greater than or equal to 75° C. and less than or equal to 200° C., greater than or equal to 75° C. and less than or equal to 150° C., greater than or equal to 75° C. and less than or equal to 100° C., greater than or equal to 85° C. and less than or equal to 200° C., greater than or equal to 85° C. and less than or equal to 150° C., greater than or equal to 85° C. and less than or equal to 100° C., greater than or equal to 95° C. and less than or equal to 200° C., greater than or equal to 95° C. and less than or equal to 150° C., or even greater than or equal to 95° C. and less than or equal to 100° C.

In embodiments, the green body part subjected to the heat application at a second temperature may have a flexural strength greater than or equal to 15 MPa, greater than or equal to 16 MPa, greater than or equal to 17 MPa, or even greater than or equal to 18 MPa. In embodiments, the green body part the green body part subjected to the heat application at a second temperature may have a flexural strength less than or equal 25 MPa, less than or equal to 23 MPa, or less than or equal to 20 MPa. In embodiments, the green body part the green body part subjected to the heat application at a second temperature may have a flexural strength greater than or equal to 15 MPa and less than or equal to 25 MPa, greater than or equal to 15 MPa and less than or equal to 23 MPa, greater than or equal to 15 MPa and less than or equal to 20 MPa, greater than or equal to 16 MPa and less than or equal to 25 MPa, greater than or equal to 16 MPa and less than or equal to 23 MPa, greater than or equal to 16 MPa and less than or equal to 20 MPa, greater than or equal to 17 MPa and less than or equal to 25 MPa, greater than or equal to 17 MPa and less than or equal to 23 MPa, greater than or equal to 17 MPa and less than or equal to 20 MPa, greater than or equal to 18 MPa and less than or equal to 25 MPa, greater than or equal to 18 MPa and less than or equal to 23 MPa, or even greater than or equal to 18 MPa and less than or equal to 20 MPa, or any and all sub-ranges formed from any of these endpoints.

In the embodiment depicted in FIG. 1, the method 100 includes optionally removing (e.g., debinding) a portion of the binder 136 from the green body part to generate a brown body part (block 110). In embodiments, as described herein, the binder 136 provides strength to the green body part and, as such, only a portion (i.e., less than all) of the binder is removed during debinding of the green body part to improve the handling strength of the resulting brown body part before sintering.

During the debinding at block 110, the green body part is heated to break down a portion of the binder 136. For example, the green body part may be heated to a temperature less than or equal to 600° C. or even less than or equal to 450° C. In embodiments, the green body part is heated to a temperature of from 250° C. to 450° C. The heating may be performed, for example, in an oxygen-free environment (e.g., in a vacuum, or inert atmosphere or combination of both), or in air for ceramic part sintering. In embodiments in which the debinding is performed in an inert atmosphere, argon, nitrogen, or another substantially inert gas may be used. In embodiments, the debinding step may be combined with the sintering step to in order to make the final consolidated part.

According to various embodiments, the debinding step of block 110 is effective to remove greater than about 95% of the binder. For example, greater than or equal to 95%, greater than or equal to 96%, greater than or equal to 97%, greater than or equal to 98%, or greater than or equal to 99% of the total amount of binder is removed during debinding. In embodiments, the portion of the binder that remains in the brown body part is less than or equal to 5%, less than or equal to 4%, less than or equal to 3%, less than or equal to 2%, or less than or equal to 1% of the amount of binder that was present prior to the debinding step. In embodiments, the portion of the binder that remains in the brown body part is from 0.05% to 2% or from 0.1% to 1% of the amount of binder that was present prior to the debinding step and is removed in the later stage of sintering process (e.g., beyond 600° C. and into the higher sintering temperatures as described in accordance with block 114 for stainless steel, nickel alloys, copper-nickel alloys and the like).

Following debinding at block 110, the method 100 continues with sintering the brown body part to form the consolidated part (block 112). During sintering, the remaining portion of the binder is removed from the brown body part and the particulate material is consolidated to form the consolidated part. Sintering imparts strength and integrity to the brown body part such that the consolidated part is suitable for use in machinery, for example.

In embodiments, sintering may be performed according to a two-step process including a pre-sintering step in which the remaining portion of the binder is removed and a sintering step in which the particulate material consolidated. In embodiments, sintering may be performed as a single step. During sintering, the brown body part is heated to temperatures of greater than or equal to 500° C., greater than or equal to 800° C., or even greater than or equal to 1000° C. In embodiments, heat may be applied by placing the brown body part in a furnace, or by exposing the brown body part to a concentrated source of energy, such as a laser beam, an electron beam, or another suitable energy source, depending on the particular embodiment.

Although various embodiments described herein are described with reference to method 100, it should be understood that embodiments of the binder described herein may be used with a variety of methods that are known and used by those skilled in the art. In particular, forming a green body part may be accomplished in a number of different ways, in a number of different steps, and in a number of different locations.

EXAMPLES

Embodiments will be further clarified by the following examples. It should be understood that these examples are not limiting to the embodiments described above.

Table 1 shows the ingredients for Example Pucks 1-21 and Example Slurry Pastes 22-27.

| Ingredient | Type | Acronym |
|---|---|---|
| 1,6-hexanediol diacrylate | difunctional acrylate monomer | HDDA |
| 1,4-cyclohexanedimethanol divinyl ether | dilunctional vinyl ether monomer | 1,4-cyclohexane-dimethanol DVE |
| triethylene glycol divinyl ether | dilunctional vinyl ether monomer | TEG DVE |
| diethylene glycol divinyl ether | difunctional vinyl ether monomer | DEG DVE |
| Acryloyl morpholine | monofunctional N-vinyl | ACMO |
| Vinyl methyl oxazolidinone | monofunctional N-vinyl | VMOX |
| Vinyl pyrrolidone | monofunctional N-vinyl | VP |
| 2,2'-azobisisobutyronitrile | thermal initiator | AIBN |
| King Industries K-PURE CXC-1612 (blocked ammonium antimony hexafluoride catalyst) | thermal initiator | CXC-1612 |
| 1. 1,1' Azobis(cyclo-hexanecarbonitrile) | thermal initiator | ACHN |
| diaryl iodonium hexafluoroantimonate salts | photoinitiator and/or super acid generating initiator | OMAN |
| 2-isopropylthioxanthene-9-one | sensitizer | ITX |

Comparative Example Pucks C1-C3 and Example Pucks 1-21 were prepared in molds using the binder and particulate material listed in Table 2. The molds were filled with the particulate material and the particulate material was tapped down to make a level surface. The binder was dispensed onto the surface of the powder and allowed to wick completely into the particulate material. The pucks were vibrated on a Buffalo Vibrator No. 220 to form a uniform suspension and uniform wicking of the binder and particular material. The pucks were then cured in a furnace under ambient atmosphere. The temperature of the furnace was ramped for 2 hours from 120° C. to 140° C., maintained for 2 hours, and cooled down to approximately 25° C. The green body pucks formed were removed from the furnace and the diameter, thickness, and flexural strength shown in Table 1.

TABLE 2

| | C1 | C2 | C3 |
|---|---|---|---|
| | | Binder | |
| Poly(vinyl alcohol) (wt %) | 4.80 | 4.80 | 4.80 |
| Ethylene glycol (wt %) | 4.40 | 4.40 | 4.40 |

TABLE 2-continued

| | | | |
|---|---|---|---|
| Ethylene glycol butyl ether (wt %) | 8.90 | 8.90 | 8.90 |
| Deionized water (wt %) | 80.94 | 80.94 | 80.94 |
| | Particulate Material | | |
| Sample powder | Sandvik 316L | Sandvik 316L | Sandvik 316L |
| | Puck Properties | | |
| Puck diameter (mm) | 47.76 | 47.79 | 47.87 |
| Puck thickness (mm) | 5.60 | 6.04 | 5.72 |
| Flexural strength (MPa) | 3.5 | 3.0 | 3.2 |
| Average flexural strength (MPa) | | 3.2 | |

| | | 1 | 2 | 3 |
|---|---|---|---|---|
| | | Binder | | |
| Monomer | VP (wt %) | 99.75 | 99.75 | 99.75 |
| Thermal initiator | AIBN (wt %) | 0.25 | 0.25 | 0.25 |
| | | Particulate Material | | |
| | Sample powder | Sandvik 316L | Sandvik 316L | Sandvik 316L |
| | | Puck Properties | | |
| | Puck diameter (mm) | 40.73 | 41.00 | 40.90 |
| | Puck thickness (mm) | 5.55 | 5.15 | 5.50 |
| | Product type | Thermoplastic product | Thermoplastic product | Thermoplastic product |
| | Flexural strength (MPa) | 6.6 | 12.3 | 11.5 |
| | Average flexural strength (MPa) | | 10.1 | |

| | | 4 | 5 | 6 | 7 | 8 |
|---|---|---|---|---|---|---|
| | | Binder | | | | |
| Monomer | HDDA (wt %) | 49.88 | 49.88 | 49.88 | 49.88 | 49.88 |
| | 1,4-cyclohexane-dimethanol DVE (wt %) | 49.88 | 49.88 | 49.88 | 49.88 | 49.88 |
| Thermal initiator | AIBN (wt %) | 0.12 | 0.12 | 0.12 | 0.12 | 0.12 |
| | CXC-1612 (wt %) | 0.12 | 0.12 | 0.12 | 0.12 | 0.12 |
| | | Particulate Material | | | | |
| | Sample powder | Sandvik MIM | Sandvik MIM | Sandvik MIM | Sandvik MIM | Sandvik 316L bimodal |
| | | Puck Properties | | | | |
| | Puck diameter (mm) | 41.00 | 41.00 | 41.00 | 41.00 | 41.00 |
| | Puck thickness (mm) | 5.00 | 5.00 | 5.15 | 5.05 | 5.25 |
| | Product type | Thermoset product | Thermoset product | Thermoset product | Thermoset product | Thermoset product |
| | Flexural strength (MPa) | 14.0 | 13.9 | 13.7 | 15.3 | 13.7 |
| | Average flexural strength (MPa) | | | 14.1 | | |

| | | 9 | 10 | 11 | 12 | 13 | 14 | 15 |
|---|---|---|---|---|---|---|---|---|
| | | Binder | | | | | | |
| Monomer | HDDA (wt %) | 49.79 | 49.79 | 49.79 | — | — | — | — |
| | 1,4-cyclohexane-dimethanol DVE (wt %) | 49.79 | 49.79 | 49.79 | — | — | — | — |
| | TEG DVE (wt %) | — | — | — | — | — | 49.88 | 49.88 |
| | DEG DVE (wt %) | — | — | — | 99.73 | 99.73 | 49.88 | 49.88 |

TABLE 2-continued

| | | | | | | | | |
|---|---|---|---|---|---|---|---|---|
| Thermal initiator | AIBN (wt %) | 0.10 | 0.10 | 0.10 | — | — | — | — |
| | CXC-1612 (wt %) | 0.12 | 0.12 | 0.12 | 0.27 | 0.27 | 0.24 | 0.24 |
| Photoinitiator | OMAN (wt %) | 0.12 | 0.12 | 0.12 | — | — | — | — |
| Sensitizer | ITX (wt %) | 0.06 | 0.06 | 0.06 | — | — | — | — |
| | | Particulate Material | | | | | | |
| | Sample powder | Sandvik 316L | Sandvik 316L | Sandvik 316L | Sandvik 316L | Sandvik 316L | Sandvik 316L | Sandvik 316L |
| | | Puck Properties | | | | | | |
| | Puck diameter (mm) | 41.00 | 41.00 | 41.00 | 61.27 | 61.60 | 50.64 | 51.27 |
| | Puck thickness (mm) | 4.75 | 4.71 | 4.75 | 7.34 | 7.09 | 5.34 | 5.25 |
| | Product type | Thermoset product | Thermoset product | Thermoset product | Thermoset product | Thermoset product | Thermoset product | Thermoset product |
| | Flexural strength (MPa) | 16.9 | 17.2 | 14.1 | 8.6 | 10.0 | 8.5 | 9.0 |
| | Average flexural strength (MPa) | | 16.1 | | 9.3 | | 8.8 | |

| | | 16 | 17 | 18 | 19 | 20 | 21 |
|---|---|---|---|---|---|---|---|
| | | Binder | | | | | |
| Monomer | HDDA (wt %) | — | — | — | — | — | — |
| | 1,4-cyclohexane-dimethanol DVE (wt %) | — | — | — | — | — | — |
| | TEG DVE (wt %) | 49.81 | 49.81 | 49.81 | 49.81 | 49.85 | 49.85 |
| | DEG DVE (wt %) | 49.81 | 49.81 | 49.81 | 49.81 | 49.85 | 49.85 |
| Thermal initiator | AIBN (wt %) | — | — | 0.12 | 0.12 | — | — |
| | CXC-1612 (wt %) | 0.25 | 0.25 | 0.12 | 0.12 | 0.12 | 0.12 |
| Super acid generating initiator | OMAN (wt %) | 0.12 | 0.12 | 0.12 | 0.12 | 0.12 | 0.12 |
| Sensitizer | ITX (wt %) | — | — | — | — | 0.05 | 0.05 |
| | | Particulate Material | | | | | |
| | Sample powder | Sandvik 316L | Sandvik 316L | Sandvik 316L | Sandvik 316L | Sandvik 316L | Sandvik 316L |
| | | Puck Properties | | | | | |
| | Puck diameter (mm) | 51.18 | 51.23 | 51.03 | 51.18 | 51.29 | 50.97 |
| | Puck thickness (mm) | 4.91 | 5.56 | 4.86 | 5.09 | 5.2 | 5.26 |
| | Network | Thermoset product | Thermoset product | Thermoset product | Thermoset product | Thermoset product | Thermoset product |
| | Flexural strength (MPa) | 10.4 | 8.2 | 10.4 | 12.5 | 11.5 | 13.2 |
| | Average flexural strength (MPa) | 9.3 | | 11.5 | | 12.4 | |

Comparative Example Pucks C1-C3, pucks prepared using a binder having the same composition including a relatively low amount of thermoplastic polymer and a relatively high amount of solvent, had an average flexural strength of 3.2 MPa. Example Pucks 1-3, Example Pucks 4-8, Example Pucks 9-11, Example Pucks 12 and 13, Example Pucks 14 and 15, Example Pucks 16 and 17, Example Pucks 18 and 19, and Examples Pucks 20 and 21, pucks prepared using a binder having the same composition including relatively high amounts of monomers polymerized by initiators, had an average flexural strength of 10.1 MPa, 14.1 MPa, 16.1 MPa, 9.3 MPa, 8.8 MPa, 9.3 MPa, 11.5 MPa, and 12.4 MPa, respectively. As indicated by Comparative Example Pucks C1-C3 and Example Pucks 1-21, using a binder including relatively high amounts of monomers polymerized by initiators results in a green body having a higher flexural strength than a green body formed using a binder including relatively low amount of thermoplastic polymer.

Example Pucks 4-8, pucks prepared using a binder having the same composition including two monomers and two thermal initiators, had an average flexural strength of 14.1 MPa. Example Pucks 9-11, pucks prepared using a binder having a similar composition as Example Pucks 4-8 but including two thermal initiators and a photoinitiator, had an average flexural strength of 16.1 MPa. As indicated by Example Pucks 4-11, using a binder including both a thermal initiator and a photoinitiator results in a green body having a higher flexural strength than a green body formed using a binder including only thermal initiators.

Example Pucks 14 and 15, pucks prepared using a binder having the same composition including two monomers and a thermal initiator, had an average flexural strength of 8.8 MPa. Example Pucks 16-21, pucks prepared using a binder having a similar composition as the binder used to prepare Example Pucks, but including at least one thermal initiator and a super acid generating initiator, had an average flexural strength of 9.3 MPa, 11.5 MPa, and 12.4 MPa, respectively. As indicated by Example Pucks 14-21, using a binder including both a thermal initiator and a super acid generating initiator results in a green body having a higher flexural strength than a green body formed using a binder including only a thermal initiator.

Example Slurry Pastes 22-27 were prepared in a steel Petri dish using the binder and particulate material listed in Table 3. 25 g of particulate material was placed in the steel Petri dish and 2.5 mL of binder was dispensed onto the particulate material. The steel Petri dish was vibrated on a vibrating table until a uniform slurry paste was formed. For UV curing proof-of-concept, Example Films 28 and 29 were formed by pipetting 20 μl of binder onto 25 g of particulate material and curing the material under UV light with an Omnicure 2000 for 5 seconds to obtain cured films. The films were peeled off from the surface of the dish and washed with isopropyl alcohol to measure thickness.

tiators, and photoinitiators present in the binder must be tailored such that exothermic formation occurs to crosslink and harder the material.

As described herein, various embodiments of binders comprise a relatively high amount (e.g., greater than or equal to 93 wt %) of a monomer polymerized by an initiator, which, as exemplified by the examples, results in a green body having a higher flexural strength than a green body formed using a binder including relatively low amount of thermoplastic polymer.

Further aspects of the invention are provided by the subject matter of the following clauses:

1. A binder comprising: greater than or equal to 93 wt % and less than or equal to 99.8 wt % of a monomer, the monomer comprising at least one of a difunctional monomer and a monofunctional monomer; greater than or equal to 0.1 wt % and less than or equal to 2 wt % of a thermal initiator; greater than or equal to 0.1 wt % and less than or equal to 3 wt % of at least one of a super acid generating initiator, a photo-thermal initiator, and a photoinitiator, and less than or equal to 1 wt % surfactant.

TABLE 3

| | | 22 | 23 | 24 | 25 | 26 | 27 | 28 | 29 |
|---|---|---|---|---|---|---|---|---|---|
| | | Binder | | | | | | | |
| Monomer | DEG DVE (wt % | 49.26 | 49.26 | 49.26 | 49.50 | 49.75 | — | 97 | 89 |
| | ACMO (wt %) | 9.85 | 9.85 | 9.85 | 9.90 | 9.95 | 19.42 | | |
| | VMOX (wt %) | 39.41 | 39.41 | 39.41 | 39.60 | 39.80 | 77.67 | | |
| Thermal initiator | AIBN (wt %) | 0.49 | — | — | — | — | | 0.5 | 3 |
| | CXC-1612 (wt %) | — | — | — | — | — | | | |
| | ACHN (wt %) | — | 0.49 | 0.49 | — | 0.50 | 0.97 | | |
| Super acid generating initiator | OMAN (wt %) | 0.99 | 0.99 | 0.99 | 0.99 | — | 1.94 | 2 | 6 |
| Sensitizer | ITX | | | | | | | 0.5 | 2 |
| | Film Thickness (μm) | | | | | | | 150 | 200 |
| | | Particulate Material | | | | | | | |
| | Sample powder | Sandvik 316L | Sandvik 316L | Sandvik 316L | Sandvik 316L | Sandvik 316L | Sandvik 316L | Sandvik 316L | Sandvik 316L |

To establish which of the Example Slurry Pastes tend to form an exotherm during a thermal reaction, the steel Petri dishes containing the Example Slurry Pastes shown in Table 3 were set on a hot plate set at 165° C. The temperature of the surface of the uniform slurry paste was measured every 60 seconds as shown in Table 4 and the slurry paste was allowed to cure.

TABLE 4

| Time (sec) | Slurry Paste 22 Temp (° C.) | Slurry Paste 23 Temp (° C.) | Slurry Paste 24 Temp (° C.) | Slurry Paste 25 Temp (° C.) | Slurry Paste 26 Temp (° C.) | Slurry Paste 27 Temp (° C.) |
|---|---|---|---|---|---|---|
| 30 | 67 | 61 | 70 | 50 | 62 | 63 |
| 60 | **96** | 77 | 75 | 61 | 68 | 88 |
| 120 | 114 | 96 | 80 | 70 | 85 | 98 |
| 180 | 98 | 100 | **98** | 77 | 87 | 101 |
| 240 | 84 | **122** | 102 | 78 | 88 | 96 |
| 300 | 83 | 83 | 115 | 75 | 88 | 92 |
| 360 | — | — | 84 | 80 | 88 | 88 |
| 420 | — | — | — | 75 | 85 | — |
| 480 | — | — | — | 80 | 100 | — |
| 540 | — | — | — | — | 87 | — |
| Visual Observation | exotherm/ hard puck | exotherm/ hard puck | exotherm/ hard puck | no cure | semi cured/still soft | semi cured/still soft |

As shown in bold in the Table above Example Slurry Pastes 22-24 showed exothermic formation, as evidence by a jump of temperature of greater than 18° C., at a certain point of time and the pucks formed were completely solid and hard after the experiment was complete. As indicated by Example Slurry Pastes 22-27, the monomers, thermal ini- 2. The binder of any preceding clause, wherein the monomer comprises monoacrylate monomers, diacrylate monomers, monovinyl ether monomers, divinyl ether monomers, monofunctional epoxy monomers, difunctional epoxy monomers, or combinations thereof.

3. The binder of any preceding clause, wherein the diacrylate monomers comprise neopentyl glycol propoxylate diacrylate, di(ethylene glycol) diacrylate, 1,6-hexanediol diacrylate, tri(propylene glycol) diacrylate, or combinations thereof.
4. The binder of any preceding clause, wherein the divinyl ether monomers comprise 1,4-cyclohexyldimethanol divinyl ether, diethylene glycol divinyl ether, triethylene glycol divinyl ether or combinations thereof.
5. The binder of any preceding clause, wherein the epoxy monomers comprise 3,4-epoxycyclohexylmethyl 3,4-epoxycyclohexanecarboxylate; diglycidyl 1,2-cyclohexanedicarboxylate; 1,2,7,8-diepoxyoctane; dicyclopentadiene dioxide; 1,4-butanediol diglycidyl ether; glycidyl 2-methylphenyl ether; 1,2-epoxydodecane; or combinations thereof.
6. The binder of any preceding clause, wherein the thermal initiator comprises at least one of a radical based thermal initiator and a cationic based thermal initiator.
7. The binder of any preceding clause, wherein the thermal initiator has a thermal decomposition temperature greater than or equal to 40° C. and less than or equal to 150° C.
8. The binder of any preceding clause, wherein the radical based thermal initiator comprises 2,2'-azobisisobutyronitrile; benzoyl peroxide; 1,1'-azobis(cyclohexanecarbonitrile); 4,4-azobis(4-cyanovaleric acid); tert-butyl peroxide; cumene hydroperoxide; tert-butyl peroxybenzoate; cyclohexanone peroxide; lauroyl peroxide; dicumyl peroxide; peracetic acid; 2,5-dimethyl-2,5-di-(2-ethylhexanoylperoxy) hexane; tert-amyl peroxypivalate; or combinations thereof.
9. The binder of any preceding clause, wherein the cationic based thermal initiator comprises a blocked ammonium antimony hexafluoride catalyst, benzyl(4-hydroxyphenyl)methylsulfonium hexafluoroantimonate, diphenyl(methyl)sulfonium tetrafluoroborate, cyclohexyl p-toluenesulfonate, or combinations thereof.
10. The binder of any preceding clause, wherein the thermal initiator comprises the radical based thermal initiator and the binder comprises the super acid generating initiator, the super acid generating initiator comprising aryl sulfonium salts, aryl iodonium salts, or combinations thereof.
11. The binder of any preceding clause, wherein the thermal initiator comprises a radical based thermal initiator and the binder comprises the photo-thermal initiator, the photo-thermal initiator comprising iodonium salt-peroxide-iodonium salt triad, sulfonium salt-peroxide-sulfonium salt triad, or combinations thereof.
12. The binder of any preceding clause, wherein the thermal initiator comprises a cationic based thermal initiator and the binder comprises the photoinitiator, the photoinitiator comprising a cationic based photoinitiator.
13. The binder of any preceding clause, wherein the cationic based photoinitiator comprises aryl sulfonium salts, benzyl p-hydroxyphenyl methylsulfonium salts, aryl iodonium salts, cyclopentadienyl(p-cymene)ruthenium(II) hexafluorophosphate, ($\eta^6$-diphenylmethane) ($\eta^5$-cyclopentadienyl) iron hexafluorophosphate ($PhCH_2PhFe^+CpPF_6^-$), ($\eta^6$-benzophenone) ($\eta^5$-cyclopentadienyl) iron hexafluorophosphate ($PhCOPhFe^+ CpPF_6^-$), or combinations thereof, or combinations thereof.
14. The binder of any preceding clause, wherein the binder further comprises greater than or equal to 0 wt % and less than or equal to 3 wt % of a triplet sensitizer.
15. The binder of any preceding clause, wherein the surfactant comprises tetramethyl decynediol (TMDD), oleic acid, or combinations thereof.
16. A method of manufacturing a part comprising depositing a layer of particulate material on a working surface; selectively applying a binder in at least one of an edge of the layer of particulate material and an infill pattern representative of a stress of the object, the binder comprising: greater than or equal to 0.1 wt % and less than or equal to 2 wt % of a thermal initiator; greater than or equal to 0.1 wt % and less than or equal to 3 wt % of at least one of a super acid generating initiator, a photo-thermal initiator, and a photoinitiator, and less than or equal to 1 wt % surfactant; repeating the steps of depositing and selectively applying to form a plurality of layers of particulate material with the applied binder; exposing the plurality of layers of particulate material with the applied binder to an excitation source to decompose the thermal initiator and initiate polymerization of the monomer to thereby form the green body part.
17. The method of any preceding clause, wherein the binder comprises the super acid generating initiator, and wherein the exposing step comprises exposing the plurality of layers of particulate material with the applied binder to ultraviolet light to decompose the super acid generating initiator and initiate polymerization of the monomer.
18. The method of any preceding clause, wherein the binder comprises the photo-thermal initiator, and wherein the exposing step comprises exposing the plurality of layers of particulate material with the applied binder to ultraviolet light to decompose the photo-thermal initiator and initiate polymerization of the monomer.
19. The method of any preceding clause, wherein the binder comprises the photoinitiator, and wherein the exposing step comprises exposing the plurality of layers of particulate material with the applied binder to ultraviolet light to decompose the photoinitiator and initiate polymerization of the monomer.
20. The method of any preceding clause, wherein the exposing step comprises applying heat the plurality of layers of particulate material with the applied binder to decompose the thermal initiator and initiate polymerization of the monomer to thereby form the green body part.
21. The method of any preceding clause, wherein applying heat comprises exposing the plurality of layers of particulate material with the applied binder to infrared light.
22. The method of any preceding clause, wherein applying heat comprises applying heat at a first temperature greater than or equal to 50° C. to the plurality of layers of particulate material to form the green body part, the green body part having a flexural strength greater than or equal to 9 MPa.
23. The method of any preceding clause, wherein the method further comprises applying heat at a second temperature greater than or equal to 75° C. to the green body part to further polymerize the monomer therein and increase the flexural strength of the green body part, the green body part having a flexural strength greater than or equal to 15 MPa.

24. A green body part comprising: a plurality of layers of particulate material; a polymer network formed from polymerization of a monomer, the monomer comprising at least one of a difunctional monomer and a monofunctional monomer, wherein the polymer network is located in at least one of an edge of the layer of particulate material and an infill pattern representative of a stress of the part.

25. The green body part of any preceding clause, wherein the polymer network is a crosslinked polymer network formed by the polymerization of at least one difunctional monomer and, optionally, at least one monofunctional monomer.

26. The green body part of any preceding clause, wherein the polymer network is a network of independent polymers formed from the polymerization of at least one monofunctional monomer.

27. The green body part of any preceding clause, wherein the polymer network is a first independent crosslinked polymer network formed from the polymerization of at least one difunctional monomer and, optionally, at least one monofunctional monomer, and a second polymer network of independent polymers formed from the polymerization of at least one monofunctional monomer.

The above embodiments, and the features of those embodiments, are exemplary and can be provided alone or in any combination with any one or more features of other embodiments provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

What is claimed is:

1. A binder comprising:

greater than or equal to 97 wt % and less than or equal to 99.8 wt % of difunctional monomers consisting of 1,6-hexanediol diacrylate and 1,4-cyclohexyldimethanol divinyl ether;

greater than or equal to 0.1 wt % and less than or equal to 2 wt % of a thermal initiator comprising a radical based thermal initiator and a cationic based thermal initiator, wherein:

the radical based thermal initiator is 2,2'-azobisisobutyronitrile; and the cationic based thermal initiator is a blocked ammonium antimony hexafluoride catalyst; and less than or equal to 1 wt % surfactant.

2. The binder of claim 1, wherein the binder further comprises monofunctional monomers selected from the group consisting of monoacrylate monomers, monovinyl ether monomers, monofunctional epoxy monomers, and combinations thereof.

3. The binder of claim 1, wherein the binder further comprises greater than or equal to 0.1 wt % and less than or equal to 2 wt % of a super acid generating initiator, and wherein the super acid generating initiator is selected from the group consisting of aryl sulfonium salts, aryl iodonium salts, and combinations thereof.

4. The binder of claim 1, wherein the binder further comprises a cationic based photoinitiator.

5. The binder of claim 4, wherein the cationic based photoinitiator is selected from the group consisting of aryl sulfonium salts, benzyl p-hydroxyphenyl methylsulfonium salts, aryl iodonium salts, cyclopentadienyl(p-cymene) ruthenium (II) hexafluorophosphate, ($\eta^6$-diphenylmethane) ($\eta^5$-cyclopentadienyl) iron hexafluorophosphate ($PhCH_2PhFe^+CpPF_6^-$), ($\eta^6$-benzophenone) ($\eta^5$-cyclopentadienyl) iron hexafluorophosphate ($PhCOPhFe^+CpPF_6^-$), and combinations thereof.

6. A method of manufacturing a part, the method comprising:

depositing a layer of particulate material on a working surface;

selectively applying the binder of claim 1 in at least one of an edge of the layer of particulate material and an infill pattern representative of a stress of the object;

repeating the steps of depositing and selectively applying to form a plurality of layers of particulate material with the applied binder;

exposing the plurality of layers of particulate material with the applied binder to an excitation source to decompose the thermal initiator and initiate polymerization of the difunctional monomers to thereby form the green body part.

7. The method of claim 6, wherein the binder further comprises greater than or equal to 0.1 wt % and less than or equal to 3 wt % of at least one of a super acid generating initiator, a photo-thermal initiator, and a photointiator, and wherein the exposing step comprises exposing the plurality of layers of particulate material with the applied binder to ultraviolet light to decompose the at least one of the super acid generating initiator, the photo-thermal initiator, and the photointiator and initiate polymerization of the difunctional monomers.

8. The method of claim 6, wherein the exposing step comprises applying heat the plurality of layers of particulate material with the applied binder to decompose the thermal initiator and initiate polymerization of the difunctional monomers to thereby form the green body part.

9. The method of claim 8, wherein applying heat comprises exposing the plurality of layers of particulate material with the applied binder to infrared light.

10. The method of claim 8, wherein applying heat comprises applying heat at a first temperature greater than or equal to 50° C. to the plurality of layers of particulate material to form the green body part, the green body part having a flexural strength greater than or equal to 9 MPa.

11. The method of claim 10, wherein the method further comprises applying heat at a second temperature greater than or equal to 75° C. to the green body part to further polymerize the difunctional monomers therein and increase the flexural strength of the green body part, the green body part having a flexural strength greater than or equal to 15 MPa.

12. A green body part manufactured by the method of claim 6.

13. The binder of claim 1, wherein the binder comprises equal amounts by weight of the 1,6-hexanediol diacrylate and the 1,4-cyclohexyldimethanol divinyl ether.

* * * * *